(12) United States Patent
Takahashi et al.

(10) Patent No.: US 11,312,045 B2
(45) Date of Patent: *Apr. 26, 2022

(54) MANUFACTURING METHOD OF COIL COMPONENT AND COIL COMPONENT

(71) Applicant: SUMIDA CORPORATION, Tokyo (JP)

(72) Inventors: Motomi Takahashi, Natori (JP); Tomohiro Kajiyama, Natori (JP); Teruaki Tanaka, Natori (JP); Shinichi Sakamoto, Natori (JP); Juichi Oki, Natori (JP); Mitsugu Kawarai, Natori (JP); Tsutomu Otsuka, Natori (JP)

(73) Assignee: SUMIDA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,192

(22) Filed: Aug. 10, 2020

(65) Prior Publication Data

US 2020/0368944 A1 Nov. 26, 2020

Related U.S. Application Data

(63) Continuation of application No. 14/845,534, filed on Sep. 4, 2015, now Pat. No. 10,786,932.

(30) Foreign Application Priority Data

Sep. 11, 2014 (CN) .......................... 201410462552.4

(51) Int. Cl.
*B29C 43/18* (2006.01)
*H01F 41/00* (2006.01)
(Continued)

(52) U.S. Cl.
CPC ............ *B29C 43/18* (2013.01); *B22F 1/0059* (2013.01); *B29C 43/00* (2013.01); *B29C 43/003* (2013.01);
(Continued)

(58) Field of Classification Search
CPC ... B29C 43/18; B29C 43/006; B29C 43/3628; B29C 43/3615; H01F 27/022
See application file for complete search history.

(56) References Cited

U.S. PATENT DOCUMENTS

| 1,877,673 | A | 9/1932 | Law |
| 2,900,664 | A | 8/1959 | Hampel et al. |

(Continued)

FOREIGN PATENT DOCUMENTS

| CN | 1274933 A | 11/2000 |
| CN | 102737802 A | 10/2012 |

(Continued)

OTHER PUBLICATIONS

Extended European Search Report corresponding to Application No. 15183716.8-1556; dated Feb. 16, 2016.

(Continued)

*Primary Examiner* — Galen H Hauth
(74) *Attorney, Agent, or Firm* — Cantor Colburn LLP

(57) ABSTRACT

A manufacturing method of a coil component comprising the steps of: preparing a coil assembly body in which a coil is attached on a magnetic core and a mold body which is formed with a cavity portion in the inside thereof and which includes at least one opening portion, putting a viscous admixture including magnetic powders and thermosetting resin and the coil assembly body in the cavity portion, pushing the put-in viscous admixture in the mold body, and (Continued)

thermally-curing the pushed-in viscous admixture and forming a magnetic exterior body which covers the coil assembly body.

9 Claims, 14 Drawing Sheets

(51) Int. Cl.

| | |
|---|---|
| B22F 1/00 | (2006.01) |
| B29C 43/00 | (2006.01) |
| H01F 27/28 | (2006.01) |
| H01F 27/29 | (2006.01) |
| H01F 17/04 | (2006.01) |
| H01F 41/061 | (2016.01) |
| H01F 41/076 | (2016.01) |
| H01F 41/02 | (2006.01) |
| B29C 43/52 | (2006.01) |
| B22F 3/12 | (2006.01) |
| B29K 83/00 | (2006.01) |
| B29K 105/16 | (2006.01) |
| B29K 505/00 | (2006.01) |
| B29L 31/34 | (2006.01) |

(52) U.S. Cl.
CPC .......... *B29C 43/52* (2013.01); *H01F 17/045* (2013.01); *H01F 27/2847* (2013.01); *H01F 27/2852* (2013.01); *H01F 27/292* (2013.01); *H01F 41/005* (2013.01); *H01F 41/0246* (2013.01); *H01F 41/061* (2016.01); *H01F 41/076* (2016.01); *B22F 3/12* (2013.01); *B29C 2043/181* (2013.01); *B29K 2083/00* (2013.01); *B29K 2105/16* (2013.01); *B29K 2505/00* (2013.01); *B29K 2995/0008* (2013.01); *B29L 2031/34* (2013.01); *H01F 2017/046* (2013.01); *H01F 2017/048* (2013.01)

(56) References Cited

U.S. PATENT DOCUMENTS

| | | |
|---|---|---|
| 3,334,163 A | 8/1967 | Gilbert |
| 4,279,854 A | 7/1981 | Blaszkowski |
| 5,672,363 A | 9/1997 | Sagawa et al. |
| 6,317,020 B1 | 11/2001 | Nakagawa et al. |
| 9,087,634 B2 | 7/2015 | Sakamoto et al. |
| 9,318,251 B2 | 4/2016 | Klesyk et al. |
| 10,032,558 B2 * | 7/2018 | Oki ................ H01F 41/0246 |
| 10,786,932 B2 * | 9/2020 | Takahashi ............ B29C 43/18 |
| 2001/0016977 A1 | 8/2001 | Moro et al. |
| 2002/0036558 A1 | 3/2002 | Nakagawa et al. |
| 2004/0046626 A1 | 3/2004 | Nakata et al. |
| 2009/0002112 A1 | 1/2009 | Atsushi et al. |
| 2009/0250836 A1 | 10/2009 | Fukui |
| 2010/0060398 A1 | 3/2010 | Lin |
| 2010/0134233 A1 | 6/2010 | Wang et al. |
| 2010/0259353 A1 | 10/2010 | Saito et al. |
| 2013/0328656 A1 | 12/2013 | Sakamoto |
| 2014/0002227 A1 | 1/2014 | Hsieh et al. |
| 2014/0266541 A1 | 9/2014 | Sakamoto et al. |

FOREIGN PATENT DOCUMENTS

| | | |
|---|---|---|
| CN | 102810392 A | 12/2012 |
| CN | 103915236 A | 7/2014 |
| EP | 2779182 A2 | 9/2014 |
| TW | 201106388 A | 2/2011 |
| WO | 2015150274 A1 | 10/2015 |

OTHER PUBLICATIONS

CNIPA Office Action for corresponding CN Application No. CN201410462552.4; dated Jan. 11, 2018.
U.S. Final Rejection for U.S. Appl. No. 14/845,534, dated Sep. 30, 2019.
U.S. Non-Final Rejection for U.S. Appl. No. 14/845,534, dated Sep. 4, 2018.
U.S. Non-Final Rejection for U.S. Appl. No. 14/845,534, dated Aug. 24, 2017.
CNIPA First Office Action for corresponding CN Application No. 201910146442.X, dated Jun. 30, 2020.

* cited by examiner

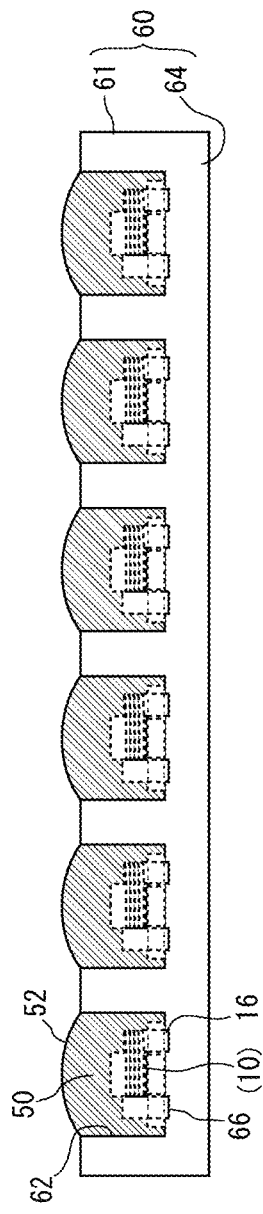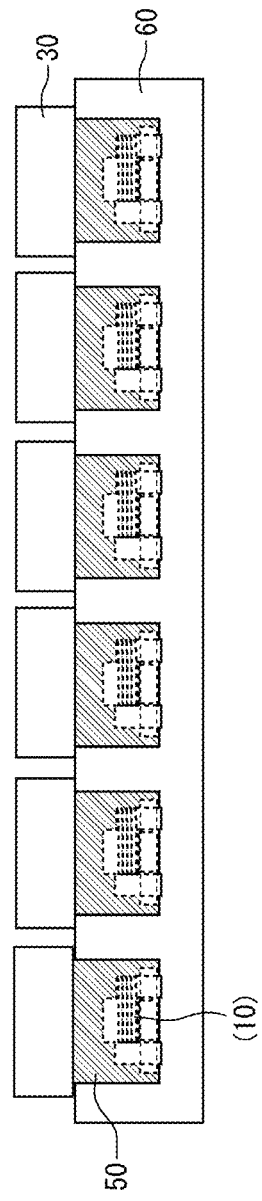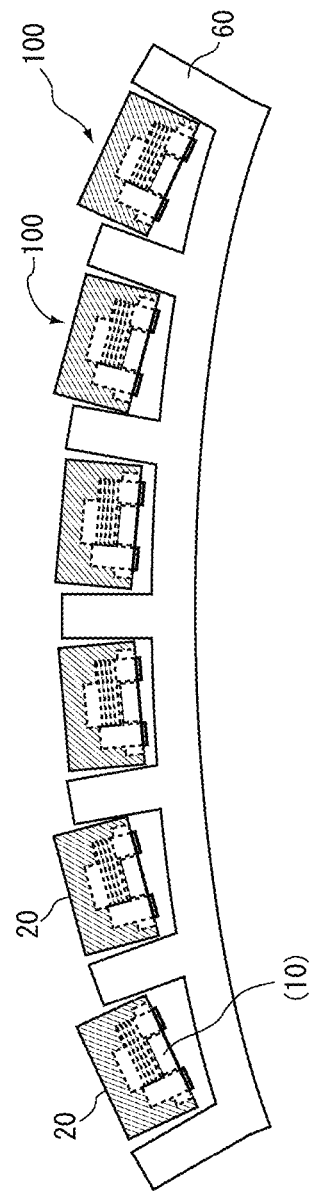

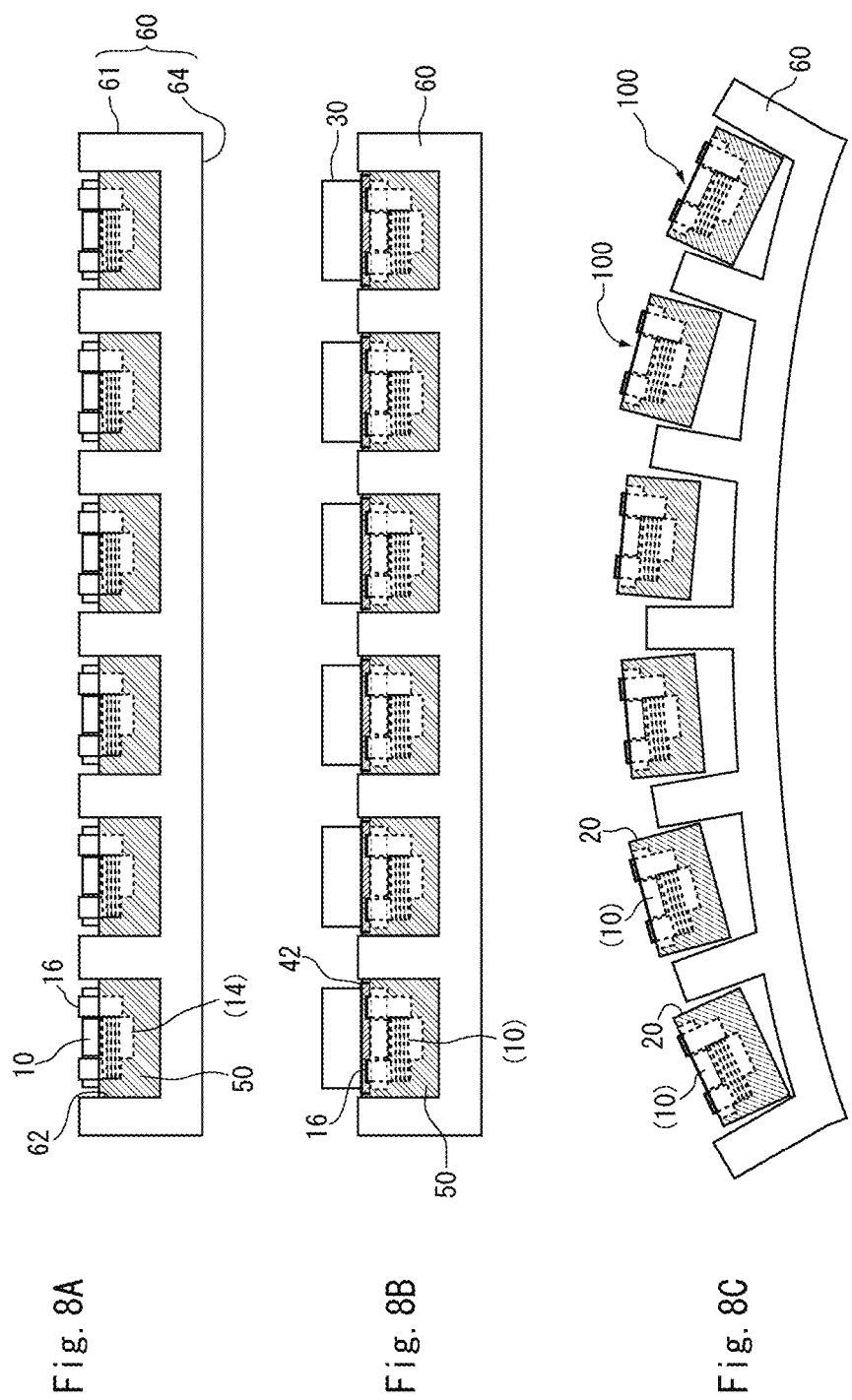

MANUFACTURING METHOD OF COIL COMPONENT AND COIL COMPONENT

CROSS REFERENCES TO RELATED APPLICATIONS

The present application is a continuation application of U.S. patent application Ser. No. 14/845,534, filed on Sep. 4, 2015, the entire contents of which are incorporated herein by reference. The Ser. No. 14/845,534 application claims priority under 35 U.S.C. § 119 to Chinese Patent Application CN201410462552.4 filed Sep. 11, 2014, the entire content of which is also incorporated herein by reference.

BACKGROUND OF THE INVENTION

Field of the Invention

The present invention relates to a manufacturing method of a coil component and a coil component.

Description of the Related Art

There is known a coil component which is an electronic component having a coil. There are various kinds of configurations for the coil components and there are provided a lot of coil components in which coils are attached to magnetic cores and these coils are covered by exterior bodies.

For the material used for the exterior body, it is general to use a non-magnetic material such as an epoxy material or the like, but there has been proposed also a coil component using a magnetic material in which magnetic bodies such as metal powders and the like are dispersed in a resin.

SUMMARY OF THE INVENTION

For a method of creating an exterior body by a magnetic material, it is conceivable to prepare such as a slurry-like or putty-like semi-fluid admixture, which is formed by mixing metal powders and a resin and by adding a solvent, and to form an exterior body by filling that admixture in the periphery of the coil. On an occasion of mass-producing the coil component provided with such an exterior body, it is required to employ a technique in which filling leakage of the admixture does not occur at the periphery or the like of the coil.

According to the present invention, there is provided a manufacturing method of a coil component comprising the steps of: preparing a coil assembly body in which a coil is attached on a magnetic core and a mold body which is formed with a cavity portion in the inside thereof and which includes at least one opening portion, putting a viscous admixture including magnetic powders and thermosetting resin and the coil assembly body in the cavity portion, pushing the put-in viscous admixture in the mold body, and thermally-curing the pushed-in viscous admixture and forming a magnetic exterior body which covers the coil assembly body.

In addition, in the manufacturing method of a coil component relating to the present invention, for a more specific embodiment, it is allowed that a press body is pressed against the viscous admixture in the step of pushing.

In addition, in the manufacturing method of a coil component relating to the present invention, for a more specific embodiment, it is allowed that in the step of pushing, the press body is pressed against a swelling portion which is a part of the viscous admixture and which overflows from the opening portion for the planarization thereof.

In addition, in the manufacturing method of a coil component relating to the present invention, for a more specific embodiment, it is allowed that the swelling portion is rubbed and cut by separating the press body which is pressed against the swelling portion from the viscous admixture while rotating it in the in-plane direction of the opening portion.

In addition, in the manufacturing method of a coil component relating to the present invention, for a more specific embodiment, it is allowed that the press body is pressed against the swelling portion while rotating it in the in-plane direction of the opening portion.

In addition, in the manufacturing method of a coil component relating to the present invention, for a more specific embodiment, it is allowed that the viscous admixture put in the cavity portion is covered by a lid member having excellent mold-releasable property, and in the step of pushing, the viscous admixture is pushed-in by pressing the press body against the lid member.

In addition, in the manufacturing method of a coil component relating to the present invention, for a more specific embodiment, it is allowed that in the step of putting, the viscous admixture is put as far as a lower position compared with the opening portion, there is provided the lid member having approximately the same shape as the opening portion inside the opening portion, and in the step of pushing, the press body having a thin diameter compared with the opening portion is pressed against the lid member.

In addition, in the manufacturing method of a coil component relating to the present invention, for a more specific embodiment, it is allowed that the viscous admixture which is pushed-in by being covered by the lid member is taken out from the mold body together with the coil assembly body, and the magnetic exterior body is formed by thermally-curing the taken-out viscous admixture.

In addition, in the manufacturing method of a coil component relating to the present invention, for a more specific embodiment, it is allowed that in the step of forming, the viscous admixture is thermally-cured inside the mold body and the magnetic exterior body is formed.

In addition, in the manufacturing method of a coil component relating to the present invention, for a more specific embodiment, it is allowed that the viscous admixture is thermally-cured inside the mold body by a first temperature, the semi-cured viscous admixture is taken out from the mold body together with the coil assembly body, and the taken-out viscous admixture is thermally-cured by a second temperature which is a higher temperature than the first temperature.

In addition, in the manufacturing method of a coil component relating to the present invention, for a more specific embodiment, it is allowed that the mold body is formed by a resin material having an excellent mold-releasable property.

In addition, in the manufacturing method of a coil component relating to the present invention, for a more specific embodiment, it is allowed that the mold body has flexibility and also includes the aligned plurality of cavity portions, in the step of putting, the viscous admixtures and the coil assembly bodies are put in the plurality of cavity portions respectively, in the step of forming, the viscous admixtures are thermally-cured inside the mold body respectively and the plurality of magnetic exterior bodies are formed, and the formed plurality of magnetic exterior bodies are taken out from the cavity portions by bending the mold body such that the mold body is bent backward toward the alignment direction of the cavity portions.

In addition, in the manufacturing method of a coil component relating to the present invention, for a more specific embodiment, it is allowed that the mold body includes a plurality of split-molds which define the cavity portions by being mutually combined.

In addition, in the manufacturing method of a coil component relating to the present invention, for a more specific embodiment, it is allowed that the split-molds are removed from the viscous admixture which was pushed-in the step of pushing by mutually separating the plurality of split-molds and the magnetic exterior body is formed by thermally-curing the viscous admixture from which the split-molds were removed.

In addition, in the manufacturing method of a coil component relating to the present invention, for a more specific embodiment, it is allowed that in the step of putting, the coil assembly body is attached to the bottom portion of the cavity portion and thereafter, the coil assembly body is buried by putting the viscous admixture, and in the step of pushing, the viscous admixture facing the opening portion is pressed toward the coil assembly body.

In addition, in the manufacturing method of a coil component relating to the present invention, for a more specific embodiment, it is allowed that the coil assembly body includes a terminal portion which is connected to the coil and which is exposed from the magnetic core, and at the bottom portion of the cavity portion, there is provided a concave portion which houses the terminal portion and which separates the terminal portion and the viscous admixture.

In addition, in the manufacturing method of a coil component relating to the present invention, for a more specific embodiment, it is allowed that the coil assembly body includes a terminal portion which is connected to the coil and which is exposed from the magnetic core, in the step of putting, the viscous admixture is put in the cavity portion and thereafter, the coil assembly body is placed on the viscous admixture such that the terminal portion is exposed from the viscous admixture, and in the step of pushing, the placed coil assembly body is pressed toward the viscous admixture in the pushing-in direction.

In addition, in the manufacturing method of a coil component relating to the present invention, for a more specific embodiment, it is allowed that a thermosetting-resin coated-layer is formed on the surface of the formed magnetic exterior body.

According to the present invention, there is provided a coil component manufactured by the aforesaid manufacturing method of a coil component.

In addition, according to the present invention, there is provided a coil component comprising: a coil assembly body in which a coil is attached to a magnetic core; a magnetic exterior body which includes magnetic powders and thermosetting resin and concurrently which covers the coil assembly body; and a terminal portion which is connected to the coil and which is exposed from the magnetic exterior body, wherein on the counter surface of the terminal portion within the magnetic exterior body, there are formed a plurality of scratch marks having concentric-circle shapes.

In addition, according to the present invention, there is provided a coil component comprising: a coil assembly body in which a coil is attached to a magnetic core; a magnetic exterior body which includes magnetic powders and thermosetting resin and concurrently which covers the coil assembly body; and a terminal portion which is connected to the coil and which is exposed from the magnetic exterior body, wherein on the counter surface of the terminal portion within the magnetic exterior body, there are arranged magnetic powders smoothly compared with the circumferential surfaces adjacent to the counter surface.

According to the manufacturing method of the coil component relating to the present invention, the viscous admixture which is put in the cavity portion is pushed therein and therefore, the viscous admixture is filled in the periphery or the like of the coil assembly body without causing an air gap. The viscous admixture includes the thermosetting resin and therefore, it is possible to create a magnetic exterior body without filling leakage by thermally-curing the viscous admixture which is pushed therein. In addition, the coil component relating to the present invention is a component which is created by the aforesaid manufacturing method or a component which suggests that it was created by the aforesaid manufacturing method, in which it is possible to form the magnetic exterior body without causing an air gap, and the coil component is a coil component excellent in the productivity.

BRIEF DESCRIPTION OF THE DRAWINGS

FIG. 7A, FIG. 7B and FIG. 7C are front elevational views schematically showing a ninth manufacturing method of the coil component;

FIG. 8A, FIG. 8B and FIG. 8C are front elevational views schematically showing a tenth manufacturing method of the coil component;

DESCRIPTION OF THE PREFERRED EMBODIMENTS

Figure 1A:
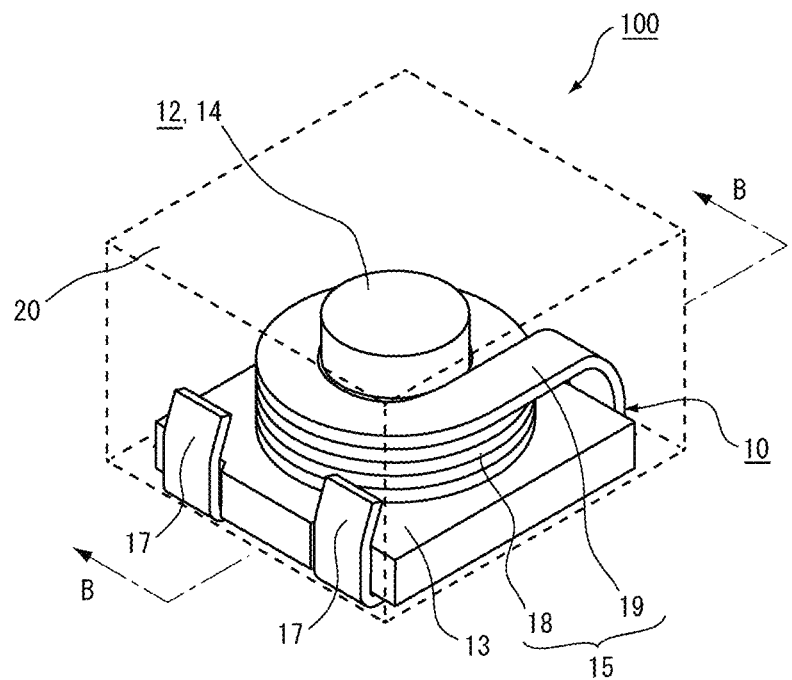
FIG. 1A is a perspective view showing one example of a coil component relating to an exemplified embodiment of the present invention.

Hereinafter, exemplified embodiments of the present invention will be explained based on the drawings. It should be noted that common reference numerals are applied to the corresponding constituent elements in the respective drawings and repetitive explanations will be omitted appropriately.

Hereinafter, a manufacturing method of a coil component relating to the present invention will be explained by using a plurality of processes which will be described in order, in which the order of the descriptions thereof is not to limit the order or the timing for executing the plurality of processes. When implementing the manufacturing method of the present invention, it is possible to change the order of the plurality of processes thereof within a range not causing a trouble in terms of the contents thereof and in addition, it is allowed for a portion of or the whole of the timing for executing the plurality of processes to be overlapped one another. For example, it is allowed to execute the putting-in process and the pushing-in process mentioned below at a timing overlapping each other and it is also allowed to execute the pushing-in process and the forming process at a timing overlapping each other.

It should be noted that on an occasion when explaining the coil component and the manufacturing method thereof, there is a case in which "upward" or "downward" is named in conformity with the direction of the indication of each drawing, but this naming is for a descriptive purpose of appropriately explaining the relative positional relations of the respective elements, in which "downward" does not always mean "vertically downward direction". For example, in the following explanation, there is exemplified an embodiment of putting a viscous admixture in the downward direction with respect to a cavity portion of a mold body, but it is not always necessary for the putting-in direction of the viscous admixture to be in conformity with the downward direction in the vertical direction. It is allowed to put the viscous admixture in the direction crossing with respect to the vertically downward direction or it is also allowed to inject the viscous admixture into the cavity portion of the mold body toward the direction upward compared with the horizontal direction. With regard to any of these cases, there will be used an expression that the viscous admixture is put in the cavity portion of the mold body.

<Coil Component>

Figure 1B:
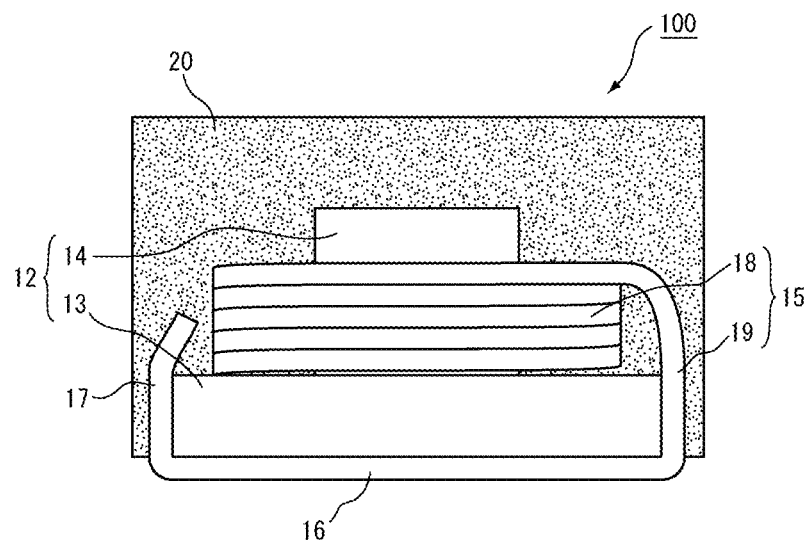
FIG. 1B is a cross-sectional view at Line B-B in FIG. 1A.

FIG. 1A is a perspective view showing one example of a coil component 100 relating to an exemplified embodiment of the present invention. FIG. 1B is a cross-sectional view at Line B-B in FIG. 1A. In FIG. 1A, for descriptive purposes, a magnetic exterior body 20 is illustrated by broken lines and a coil assembly body 10 which is covered by the magnetic exterior body 20 is illustrated by solid lines. In FIG. 1B, hatching is applied only to the cross-section surface of the magnetic exterior body 20 and hatching is omitted for the cross-sectional surface of the coil assembly body 10.

First, there will be explained an outline of the coil component 100 of this exemplified embodiment. The coil component 100 of this exemplified embodiment is an electronic component which includes a coil 15 and in which the coil 15 generates inductance by supplying power to a terminal portion 16, and specifically, this component is an inductor, a transformer, a choke coil or the like. In this exemplified embodiment, for the sake of simplicity, an inductor having a single winding is illustrated by an example as the coil component 100.

The coil component 100 is provided with the coil assembly body 10 in which the coil 15 is attached to a magnetic core 12, the magnetic exterior body 20 which includes magnetic powders and thermosetting resin and concurrently which covers the coil assembly body 10, and the terminal portion 16 which is connected to the coil 15 and which is exposed from the magnetic exterior body 20.

The magnetic core 12 is provided with a plate-shaped portion 13 and a core portion 14 which rises from this plate-shaped portion 13. In this exemplified embodiment, there is exemplified an aspect in which the plate-shaped portion 13 forms a rectangular plate shape and the core portion 14 forms a cylindrical shape, but the present invention is not limited by this aspect. In addition, in this exemplified embodiment, there is exemplified an aspect in which a plate-shaped portion 13 is formed only on a single end side (lower end side in FIG. 1B) of the core portion 14, but the present invention is not limited by this aspect and it is allowed for the plate-shaped portion 13 to be formed on the both end sides of the core portion 14.

The plate-shaped portion 13 and the core portion 14 are formed by a single material integrally and constitute the magnetic core 12. The magnetic core 12 is a ferrite core formed by burning ferrite or a dust core formed by compressing and molding magnetic powders. For the magnetic powders of the dust core, it is possible to use magnetic powders in which iron (Fe) is made to be the main component and in which silicone (Si) and chromium (Cr) are added respectively in a ratio of 1 wt % or more and also of 10 wt % or less. Such magnetic powders are excellent in terms of rust resistance, relative permeability or the like. From the viewpoint of reducing core loss, it is also allowed to use metal magnetic powders formed by mixing the aforesaid magnetic powders and amorphous metals. For the amorphous metal, it is possible to use a carbon containing amorphous metal in which iron (Fe) is made to be the main component and in which silicone (Si) and chromium (Cr) are contained respectively in a ratio of 1 wt % or more and also of 10 wt % or less, and further, in which carbon (C) is contained in a ratio of 0.1 wt % or more and also of 5 wt % or less.

The coil 15 is constituted by applying single winding or multiple windings for the winding. It is also allowed for the winding to use not only a round wire but also a flat wire. In this exemplified embodiment, there is used a rectangular wire whose width size is adequately large compared with the thickness size thereof. The coil 15 of this exemplified embodiment is a so-called edgewise coil which is wound spirally by setting short sides of the rectangular wire in a the diameter direction and by setting the thickness-direction (up and down direction in FIG. 1B) of the rectangular wire parallel to the winding-axis direction of the coil. In this exemplified embodiment, there is illustrated as an example a coil 15 obtained by winding-around the wire beyond five turns and in which the windings are mutually laminated, but the number of turns is not limited by this aspect.

A wound portion 18 of the coil 15 is attached to the periphery of the core portion 14 such that the extending direction of the core portion 14 will coincide with the winding-axis direction. It is allowed for the lower surface of the wound portion 18 of the coil 15 to be adhesively fixed by using an adhesive agent with respect to the upper surface of the plate-shaped portion 13 of the magnetic core 12. It is possible for the adhesive agent to use a resin adhesive agent having an insulating characteristic.

A non-wound portion 19 drawn from the wound portion 18 within the coil 15 is bent toward the downward direction along the side surface of the plate-shaped portion 13 of the magnetic core 12 and further is bent again so as to go along the lower surface of the plate-shaped portion 13, in which there is constituted a terminal portion 16. Further, each distal end of the non-wound portion 19 within the coil 15 is bent so as to rise upward from the plate-shaped portion 13, in which there is constituted a terminal-end portion 17. Toward the core portion 14 the terminal-end portion 17 is bent slightly to the inside of the magnetic exterior body 20. Thus, the terminal-end portions 17 are prevented from protruding from the magnetic exterior body 20. On the side surface of the plate-shaped portion 13 of the magnetic core 12, there are formed side-surface concave portions having groove-shapes (not shown) for being fitted with the non-wound portion 19 (including terminal-end portion 17) of the coil 15. Thus, a portion of or the whole of the thickness of the winding (rectangular wire) of the non-wound portion 19 is housed in the side-surface concave portion and therefore, it is possible to reduce the thickness by which the non-wound portion 19 protrudes from the side surface of the plate-shaped portion 13. It is allowed for the non-wound portion 19 of the coil 15 to be adhesively fixed onto the side-surface concave portion of the plate-shaped portion 13 by using an adhesive agent.

In addition, on the bottom surface of the plate-shaped portion 13, there is formed an electrode groove having a groove-shape (not shown) for being fitted with the terminal portion 16 of the non-wound portion 19. The width of the electrode groove is approximately the same as that of the terminal portion 16. The depth of the electrode groove is shallow compared with the thickness of the winding (rectangular wire) of the non-wound portion 19 and the electrode groove houses a portion of the thickness of the terminal portion 16. Thus, the terminal portion 16 will be fitted with the electrode groove in a state in which the lower surface of the terminal portion 16 protrudes downward compared with the bottom surface of the plate-shaped portion 13. It is allowed for the upper surface of the terminal portion 16 to be adhesively fixed on to the electrode groove of the plate-shaped portion 13 by using an adhesive agent.

The terminal portion 16 is a portion of the coil 15 and is connected with the wound portion 18 of the coil 15. The terminal portion 16 is exposed from the magnetic exterior body 20 and is used as an electrode. The terminal portion 16 is formed flatly along the lower surface of the coil component 100 and is used as a surface-mounting terminal. The coil 15 is applied with insulation coating except the lower surface side of the terminal portion 16.

In addition to the above, it is allowed for the coil 15 to employ a configuration in which the wound portion 18 is formed by using a round wire and the terminal portion 16 is created by flatly crushing the longitudinal area for the portion portioned at the lower surface of the plate-shaped portion 13.

The magnetic exterior body 20 is composed of a material containing magnetic powders and thermosetting resin and covers the coil assembly body 10. The wording "the magnetic exterior body 20 covers the coil assembly body 10" means that the magnetic exterior body 20 covers at least a portion of the coil assembly body 10. The magnetic exterior body 20 of this exemplified embodiment forms an approximately rectangular shape and embeds the whole of the wound portion 18 of the coil 15 and the core portion 14 of the magnetic core 12. However, the shape of the body 20 can be designed arbitrary and is not to be limited by "approximately rectangular shape".

The terminal portion 16 is exposed from the lower surface side of the magnetic exterior body 20. It is allowed for the plate-shaped portion 13 of the magnetic core 12 to be covered totally by the magnetic exterior body 20 or it is also allowed to employ a configuration in which a portion of the lower surface or the like of the plate-shaped portion 13 is exposed from the magnetic exterior body 20. In this exemplified embodiment, there is illustrated as an example a configuration in which the lower surface of the plate-shaped portion 13 and terminal portion 16 are exposed from the magnetic exterior body 20, and the magnetic exterior body 20 embeds and covers the circumferential surface and the upper surface, from which the core portion 14 protrudes, of the plate-shaped portion 13, and the coil assembly body 10 except the terminal portion 16.

It is allowed for the magnetic powders constituting the magnetic exterior body 20 to use the same kind of material as that of the magnetic core 12 or it is also allowed to use a different material.

Such a coil component 100 of this exemplified embodiment is manufactured by one of the first to tenth manufacturing methods (referred to as from first manufacturing method to tenth manufacturing method, respectively) which will be explained hereinafter. There is a case in which the first to tenth manufacturing methods are named as "this method" all together.

Figure 10:
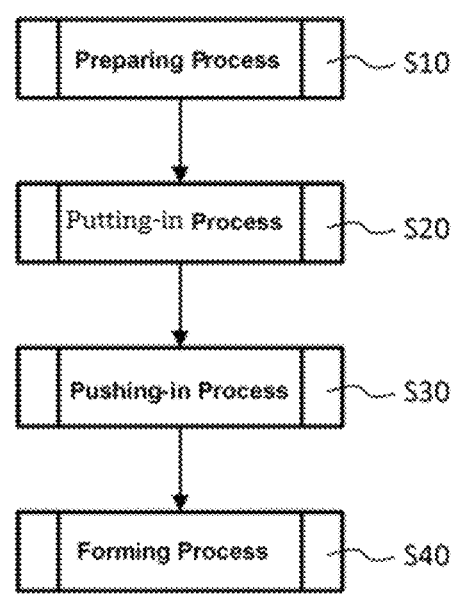
FIG. 10 is a flowchart showing a whole process in the manufacturing method of the coil component relating to the present invention.

FIG. 10 is a flowchart showing a whole process in the manufacturing method of the coil component 100 and this flowchart is common for the first to tenth manufacturing methods. First, there will be explained the outline of this method.

This method includes a preparing process S10, a putting-in process S20, a pushing-in process S30 and a forming process S40. The preparing process S10 is a process for preparing a coil assembly body 10 in which a coil 15 is attached to a magnetic core 12, and a mold body 60 in which a cavity portion 62 is formed thereof and which includes at least one opening portion 70. The putting-in process S20 is a process for putting a viscous admixture 50, which includes magnetic powders and thermosetting resin, and a coil assembly body 10 in the cavity portion 62. The pushing-in process S30 is a process for pushing the put-in viscous admixture 50 in the mold body 60. Then, the forming process S40 is a process for thermally-curing the pushed-in viscous admixture 50 and for forming a magnetic exterior body 20 which covers the coil assembly body 10.

It should be noted that the wording "pushing-in process" in this method means that the viscous admixture 50, which is the processing target, is deformed substantially without changing the volume thereof; is moved as far as every corner of the cavity portion 62 of the mold body 60; and is fully filled therein. Therefore, the "pushing-in process" in this method is distinguished from a conventional "compression process" in which the volume is significantly reduced by compressing the processing target such as ferrite by using a high pressure. While a high pressing force from around 0.5 tons to several tons is generally loaded onto the processing target in the conventional "compression process", it is sufficient for the "pushing-in process" in this method if a low pressing force such as, for example, from around 0.5 kg to 50 kg is to be loaded onto the viscous admixture 50. For this reason, the "pushing-in process" in this method has such a merit that damage to the mold body 60 is little and therefore, the selection range of the material for the mold body 60 becomes wide.

Next, there will be explained this method in detail.

Figure 11:
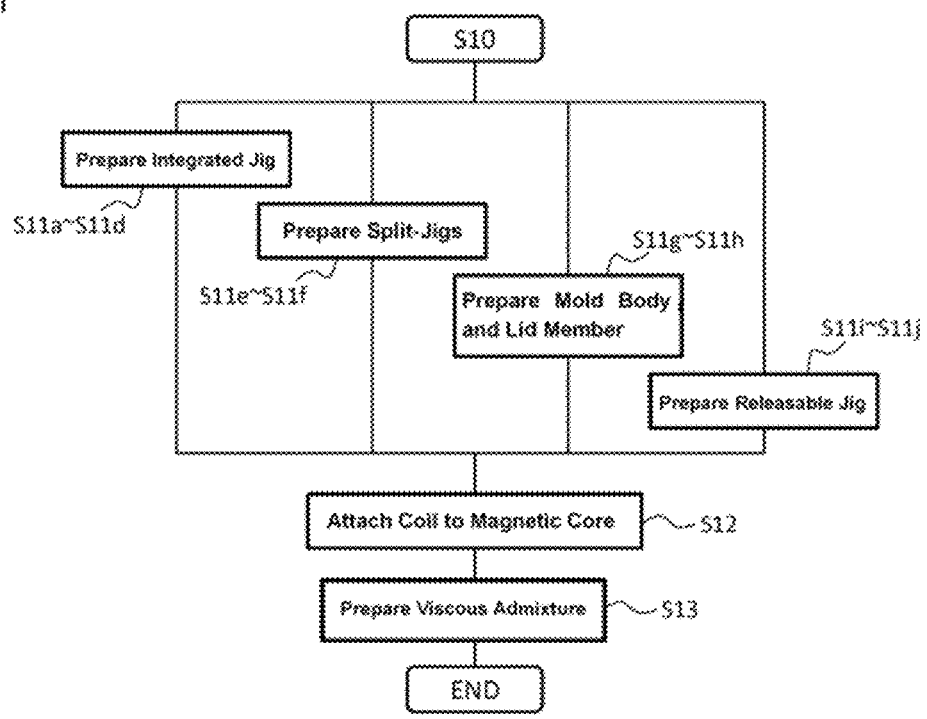
FIG. 11 is a flowchart showing a preparing process in the first to tenth manufacturing methods.
Figure 12:
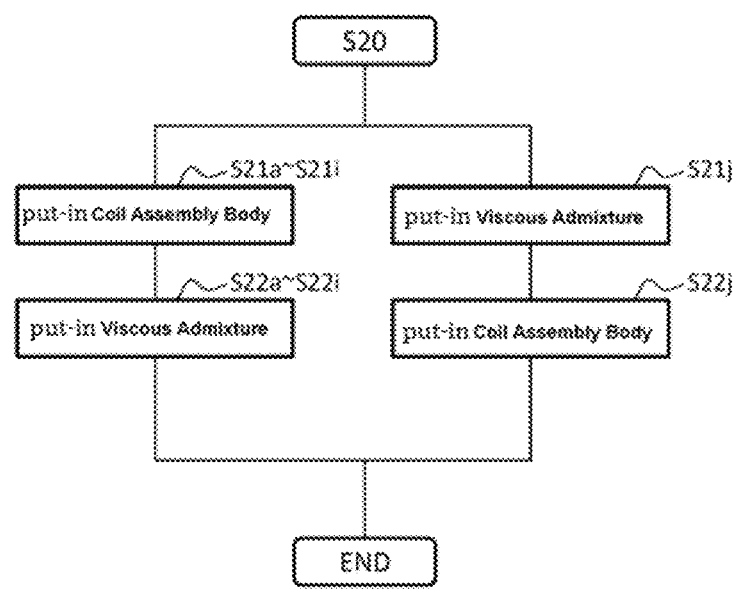
FIG. 12 is a flowchart showing a putting-in process in the first to tenth manufacturing methods.
Figure 13:
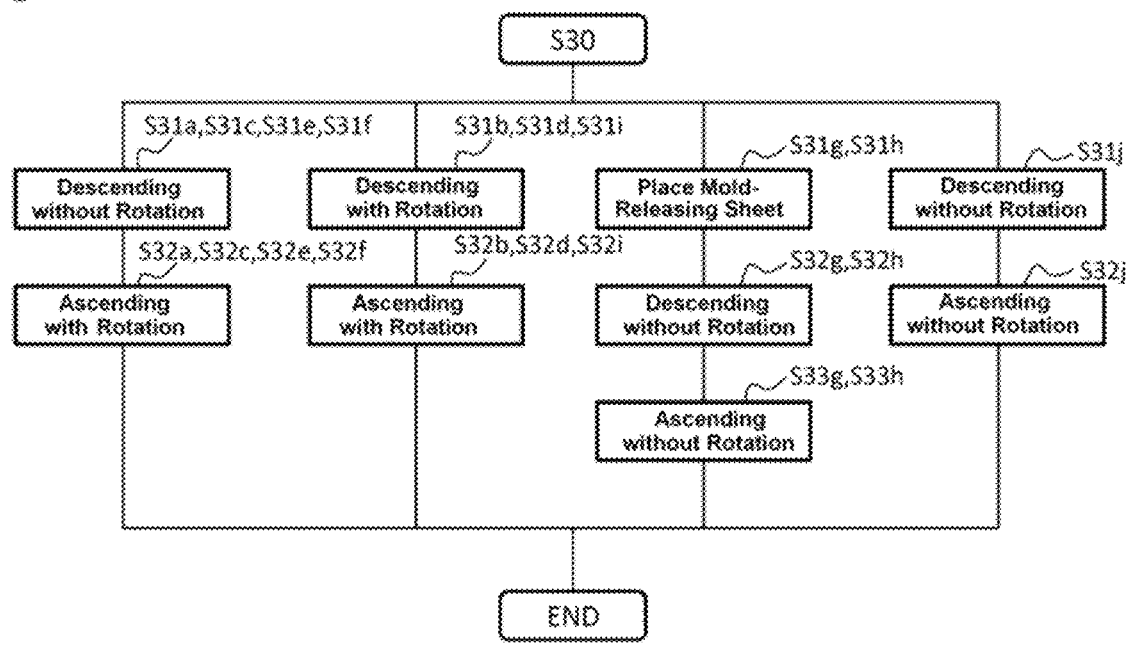
FIG. 13 is a flowchart showing a pushing-in process in the first to tenth manufacturing methods.
Figure 14:
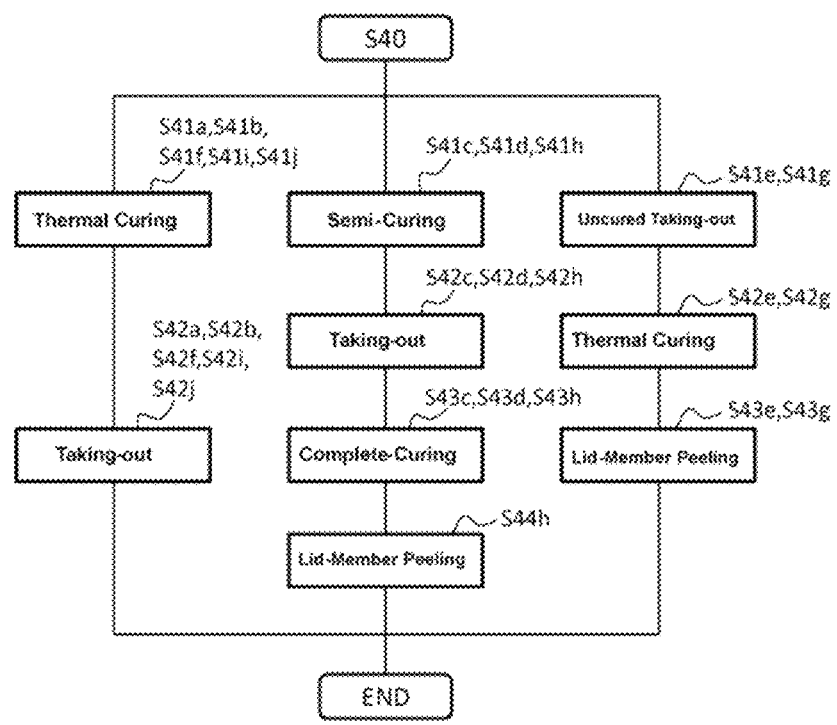
FIG. 14 is a flowchart showing a forming process in the first to tenth manufacturing methods.

FIG. 11 is a flowchart showing a preparing process S10 in the first to tenth manufacturing methods. FIG. 12 is a flowchart showing a putting-in process S20 in the first to tenth manufacturing methods. FIG. 13 is a flowchart showing a pushing-in process S30 in the first to tenth manufacturing methods. FIG. 14 is a flowchart showing a forming process S40 in the first to tenth manufacturing methods. In the flowcharts of FIG. 11 to FIG. 14, suffix "a" is applied for the process corresponding to the first manufacturing method. Similarly, suffixes from "b" to "j" are applied sequentially to the processes corresponding to the methods from the second manufacturing method to the tenth manufacturing method.

In the preparing process S10, there are prepared the mold body 60, the coil assembly body 10 and the viscous admixture 50. It is possible for the processes from S11a to S11j and the processes S12 and S13 shown in FIG. 11 to be carried out in arbitrary orders, it is not always necessary to be carried out in the order shown in FIG. 11 and it is allowed for the portions of the implementation timings to be overlapped one another.

In the methods from the first manufacturing method to the tenth manufacturing method, a plurality of different mold bodies 60 are used. Therefore, the processes S11a to S11j which prepare mold bodies 60 will be mentioned individually in the explanations of the respective manufacturing methods mentioned below.

In the process S12 for preparing the coil assembly body 10, a wound portion 18 of a coil 15 is formed by winding a rectangular wire into an Edgewise shape. Such a coil 15 is attached onto a magnetic core 12 which includes a core portion 14 and a plate-shaped portion 13, and is adhesively fixed one another by an adhesive agent arbitrarily. In addition, the non-wound portion 19 of the coil 15 is bend along the plate-shaped portion 13 and the terminal portion 16 and the terminal-end portion 17 are formed, and further, the insulating coating of the portion 16 is removed. Thus, the coil assembly body 10 is created.

In the process S13 for preparing the viscous admixture 50, the viscous admixture 50 is prepared by kneading the magnetic powders and the thermosetting resin. For the magnetic powder which is the first component in the viscous admixture 50, it is possible to use a metal magnetic powder including iron as the main component, in which there is added chromium (Cr), silicone (Si), manganese (Mn) or the like. In addition to this aspect, it is allowed for the metal magnetic powder to be added with nonmetal-material powder such as of carbon or the like. It is possible for the thermosetting resin which is the second component in the viscous admixture 50 to list up epoxy resin, phenol resin and silicone resin as examples.

Other than the aforesaid components, it is possible to add a solvent selectively to the viscous admixture 50. More specifically, for the third component of the viscous admixture 50, it is possible to include a solvent. Thus, it is possible to set the viscous admixture 50 to have a desired coefficient viscosity. In other words, in case of not adding a solvent to the viscous admixture 50, the viscous admixture 50 will have a high coefficient viscosity and the fluidity thereof becomes very low. In addition, in case of not adding a solvent to the viscous admixture 50, the process for removing the solvent becomes unnecessary in which there is an effect of reducing the number of processes in this method. On the one hand, in case of adding a solvent to the viscous admixture 50, the coefficient viscosity of the viscous admixture 50 becomes low. For this reason, in case of filling this viscous admixture 50 in the mold body 60, it is possible to fully fill the viscous admixture 50 in the cavity portion 62 of the mold body 60 without gaps. In addition, in case of adding a solvent in the viscous admixture 50, it is necessary to carry out a process for removing the solvent. It is possible to carry out the process for removing the solvent between the pushing-in process S30 and the forming process S40 or during the forming process S40.

It is possible for the solvent to use a liquid in which amphiphilic molecules including both of hydrophilic group and lipophilic group are made to be main components, and specifically, it is possible to use an alcohol such as terpineol (terpineol) or a volatile organic solvent such as acetone.

For a specific viscous admixture 50, it is possible to mix the metal magnetic powders and the epoxy resin by the mass ratio of 91:9 to 95:5 (both the ends values are inclusive) with regard to the component ratio thereof. Further, it is possible to prepare the composite by adding a solvent selectively. For one example of the metal magnetic powder, it is possible to cite a powder obtained by mixing an amorphous metal magnetic powder, which at least contains iron, silicone, chromium and carbon, and an iron-silicone-chromium based alloy powder by a mass ratio of 1:1.

A solvent is not added to the viscous admixture 50, or even in a case in which a solvent is added, it is possible by using terpineol as the solvent to set the addition amount of the solvent to be less than 2 wt % with respect to the mass of the viscous admixture 50. Thus, it is possible to set the viscous admixture 50 in a putty-like state in which the fluidity is low. Such a viscous admixture 50 has a high coefficient viscosity so as not to flow or disperse like a liquid even in a case of being placed on a plane surface. Instead of the above, in case of adding a solvent to the viscous admixture 50, it is possible, by using acetone for this solvent and also by setting the addition amount of the solvent to be 2 wt % or more, to set the viscous admixture 50 in a slurry state in which the fluidity is comparatively high.

Hereinafter, there will be sequentially explained the features which are inherent in the methods from the first manufacturing method to the tenth manufacturing method.

<First Manufacturing Method>

Figure 2A:
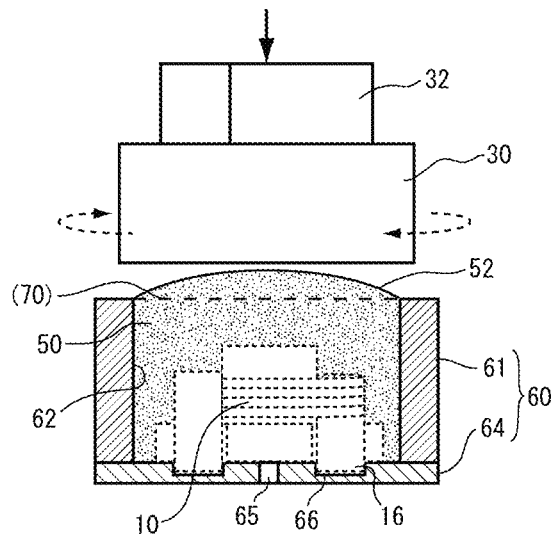
FIG. 2A, FIG. 2B and FIG. 2C are front elevational views schematically showing first to fourth manufacturing methods of the coil component.
Figure 2B:
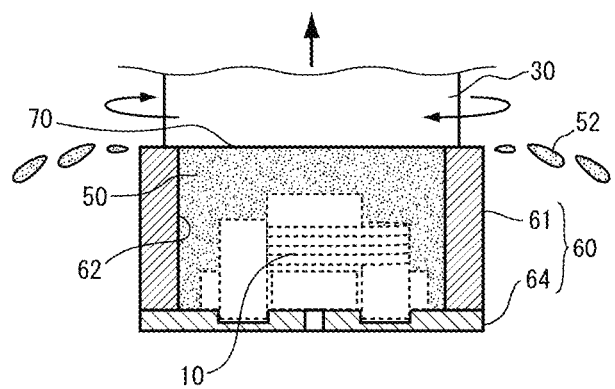
Figure 2C:
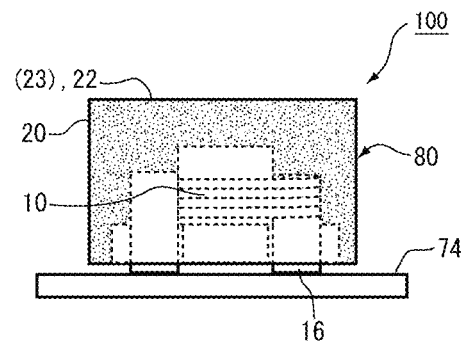
Figure 3:
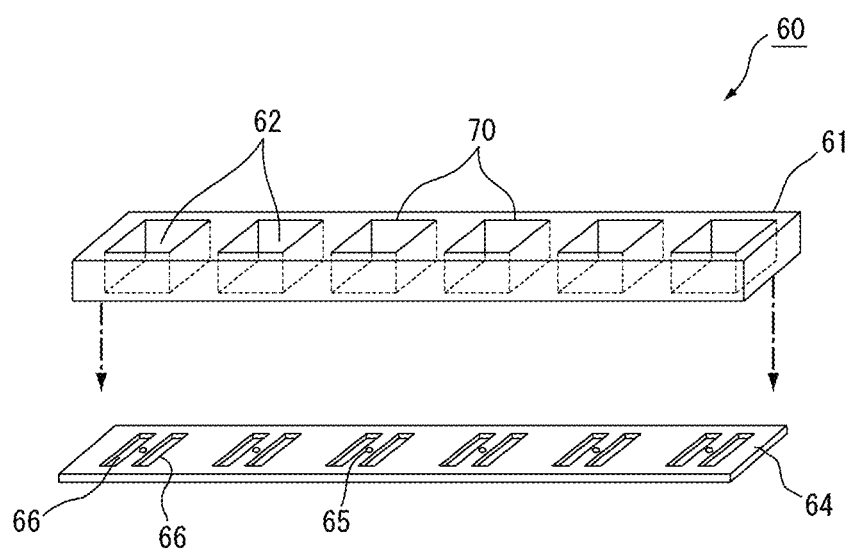
FIG. 3 is an exploded perspective view of showing a mold body which is used in the first to fourth manufacturing methods.
Figure 4A:
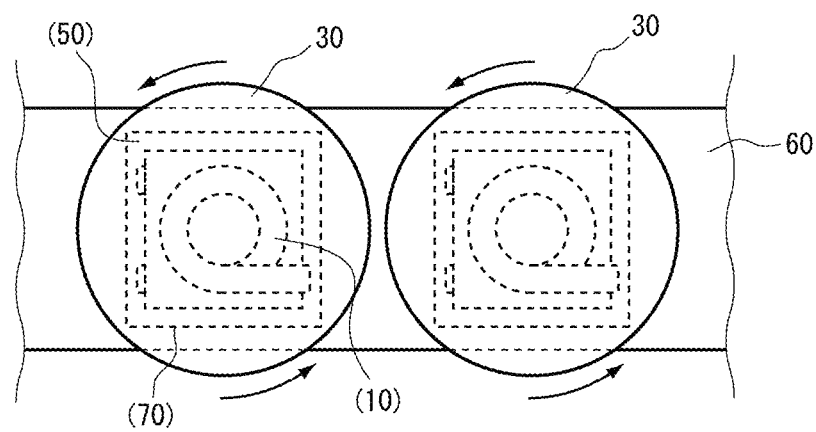
FIG. 4A is a plan view schematically showing a pushing-in process in the first to fourth manufacturing methods.
Figure 4B:
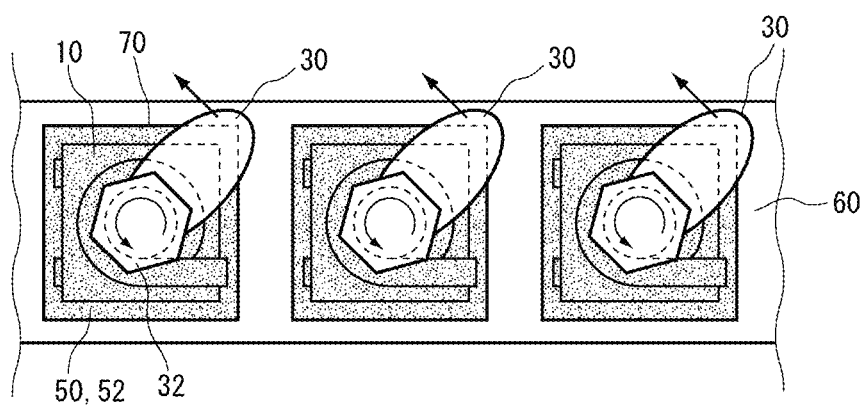
FIG. 4B is a plan view schematically showing a modified example of the pushing-in process in the first to fourth manufacturing methods.

FIG. 2A, FIG. 2B and FIG. 2C are front elevational views schematically showing first to fourth manufacturing methods of the coil component 100. It should be noted in FIGS. 2A to 2C that with regard to the hatching showing the cross-section of the coil assembly body 10, the illustration thereof is omitted. FIG. 3 is an exploded perspective view of showing a mold body 60 which is used in the first to fourth manufacturing methods. FIG. 4A is a plan view schematically showing a pushing-in process S30 in the first to fourth manufacturing methods. FIG. 4B is a plan view schematically showing a modified example of the pushing-in process in the first to fourth manufacturing methods.

In the processes S11a to S11d within the preparing process S10, there are prepared an integrated jig 61 and a bottom unit 64 for the mold body 60. The integrated jig 61 is a frame body for which a plurality of cavity portions 62 are formed therethrough. It is possible to create the integrated jig 61 by a metal material such as stainless steel or the like, but it is allowed to create it by a resin material having an excellent mold-releasable property, which is exemplified by a fluororesin material such as polytetrafluoroethylene (PTFE) or the like.

In FIG. 3, an integrated jig 61 formed with 6 pieces of cavity portions 62 is shown as an example, but the number of the cavity portions 62 are not limited in particular and it is allowed to provide, for example, 10 pieces or the like. In FIG. 3, an integrated jig 61 for which a plurality of cavity portions 62 are aligned in line is shown as an example, but it is not limited by this configuration. It is also allowed for the cavity portions 62 to be aligned in a plurality of columns such as in a lattice-shape, in a zigzag-like shape or the like.

The bottom unit 64 is a member which is attached to the downward side of the integrated jig 61 and closes the openings on the downward side of the cavity portions 62. By combining the integrated jig 61 and the bottom unit 64, there is constituted the mold body 60 in which the opening portions 70 open toward the upward direction of the cavity portions 62 respectively. The integrated jig 61 and the bottom unit 64 are integrally assembled by a holder (not shown).

It is preferable to coat a release-agent on the circumferential wall surface of the cavity portion 62. Thus, in a process S42a of the forming process S40, which will be mentioned later, it is possible to take out the coil components 100 from the mold body 60 easily.

As described above, the coil assembly body 10 is connected to the coil 15 and includes the terminal portions 16 which are exposed from the magnetic core 12. At the bottom unit 64 of the cavity portion 62, there are provided concave portions 66 which house the terminal portions 16 and separate the terminal portions 16 and the viscous admixture 50. The concave portions 66 are formed at the positions corresponding to the pair of the terminal portions 16. For the bottom unit 64, there are formed a plurality of pairs of concave portions 66 at the positions corresponding to the plurality of the cavity portions 62 respectively. It is allowed for the concave portions 66 to be penetrating grooves (slits) which penetrate the bottom unit 64 or it is also allowed to employ bottomed concave grooves.

Between the pair of the concave portions 66, there is formed a vent 65 which penetrates the bottom unit 64. The vent 65 is formed with respect to each pair of the plurality of pairs of the concave portions 66. Thus, in a state in which the coil assembly body 10 is put in the cavity portion 62 and the terminal portions 16 are fitted with the concave portion 66 of the bottom unit 64, it is possible to discharge the air inside the cavity portion 62 from the vent 65.

In the putting-in process S20 for the first to fourth manufacturing methods, as shown in FIG. 12, the coil assembly body 10 is put in the cavity portion 62 (Processes S21a to S21d) and thereafter, the viscous admixture 50 is put in the cavity portion 62 (Processes S22a to S22d).

More specifically, in the putting-in process S20 of the first manufacturing method, the coil assembly body 10 is attached onto the bottom unit 64 of the cavity portion 62 and thereafter, the viscous admixture 50 is put-in and the coil assembly body 10 is buried. Then, in the pushing-in process S30, the viscous admixture 50 which faces the opening portion 70 is pressed toward the coil assembly body 10.

In more specifically, the viscous admixtures 50 are measured beforehand and are put in the cavity portions 62 respectively. In a case in which the viscous admixture 50 is in a slurry state, the viscous admixture 50 is filled in the periphery of the coil assembly body 10 by that admixture and the cavity portion 62 is filled with the viscous admixture 50. In addition, in a case in which the viscous admixture 50 is in a putty-like state, a lot of the viscous admixture 50 remains in a state of being contact with the upper portion of the coil assembly body 10 and only a portion of the cavity portion 62 is fully filled with the viscous admixture 50. Further, in the first manufacturing method, as shown in FIG. 2A, a viscous admixture 50 having a volume more than the volume that is obtained by excluding the coil assembly body 10 from the internal volume of the cavity portion 62 is put in the cavity portion 62 in a state of rising from the level of the opening portion 70 of the mold body 60. Thus, as shown in FIG. 2A, for the viscous admixture 50, there is formed a swelling portion 52 which overflows from the opening portion 70.

In the pushing-in process S30 of the first manufacturing method shown in FIG. 2A and FIG. 13, the planarization is realized by pressing the press body 30 against the swelling portion 52 which overflows from the opening portion 70 within the viscous admixture 50. Thus, the viscous admixture 50 which is in a state of rising from the opening portion 70 is flattened and concurrently, at least a portion of the viscous admixture 50 is pushed in the cavity portion 62 and the viscous admixture 50 is filled in the whole cavity portion 62.

The press body 30 is a jig having a rod-shape which is provided elevatably with respect to the mold body 60. There is formed a grasping portion 32 having a rectangular cross-section at the upper portion of the press body 30. The grasping portion 32 is a head portion for being fixed to a chucking device (not shown). The chucking device is elevation-driven with respect to the mold body 60 by an elevation mechanism of a hydraulic control system (not shown). There is no limitation for the shape of the grasping portion 32 in particular and it is possible to employ a prismatic shape such as of a rectangular body, of a hexagonal column or the like. Thus, it is possible to fix the grasping portion 32 to the chucking device firmly.

By pressing the press body 30 against the viscous admixture 50 in the pushing-in process S30, the swelling portion 52 is pressed physically and the viscous admixture 50 is impregnated in the whole inside the cavity portion 62 such as the gaps of the coil 15 or the like. At that time, the air which existed inside the cavity portion 62 is discharged from the vent 65 of the bottom unit 64 toward the downward direction of the mold body 60.

In the pushing-in process S30 of the first manufacturing method, the press body 30 descends with respect to the mold body 60 with non-rotation substantially without rotation (Process S31a). Thus, a static pressure is applied with respect to the swelling portion 52 of the viscous admixture 50. It should be noted that the rotation of the press body 30 is shown by broken lined arrows in FIG. 2A and this means that in a second and a fourth manufacturing methods mentioned below, the press body 30 is descended toward the mold body 60 while being rotated.

Next, in the pushing-in process S30 of the first manufacturing method, as shown in FIG. 2B, the press body 30 which is pressed against the swelling portion 52 is separated from the viscous admixture 50 while being rotated toward the in-plane direction of the opening portion 70. Thus, it is possible to rub and cut the swelling portion 52 of the viscous admixture 50 by the rotating press body 30 (Process S32a in FIG. 13).

Here, the matter that the press body 30 is separated from the viscous admixture 50 by being ascended while being rotated includes both of an aspect in which the press body 30 is ascended at the same time with the rotation start and an aspect in which the press body 30 is ascended after being rotated in contact with the lid member 40 in a predetermined time period. It should be noted that the processes S32a to S32d in which the press body 30 is ascended from the mold body 60 while being rotated are common in the first to fourth manufacturing methods.

In the planar view of the mold body 60 (see FIG. 4A), a passing area when the press body 30 is axially-rotated covers the whole of the opening portion 70 of the mold body 60. Thus, by axially-rotating the press body 30 at the height position at which the lower surface of the press body 30 is in contact with the opening portion 70 of the mold body 60, the swelling portion 52 of the viscous admixture 50 is cut off and scattered toward the outward direction of the opening portion 70 (see FIG. 2B). For this reason, the viscous admixture 50 is rubbed and cut by the axial-rotation action of the press body 30. It should be noted in FIG. 4A that with regard to the grasping portion 32 (see FIG. 2A) which is integrally formed on the upward side of the press body 30, the graphic illustration thereof is omitted.

For one example of the press body 30, it is possible to cite a rod-shaped body (pin) having a cylindrical shape as shown in FIG. 4A. The diameter of the circular cross-section obtained by cutting the press body 30 perpendicularly with respect to the rotation axis is larger than the diagonal length of the opening portion 70. The rotation axis of the press body 30 is approximately in conformity with the center axis of the opening portion 70 in the planar view thereof. Thus, the press bodies 30 rotate axially around the center axes of the opening portions 70, apply shearing stresses simultaneously with respect to the whole swelling portions 52 (see FIG. 2A) which overflow from the opening portions 70, and rub and cut these swelling portions.

In case of using a cylindrical press body 30, the diameter of the press body 30 is larger than the diagonal length of the opening portion 70 as described above and also is smaller than the distance between the centers of the opening portions 70 adjacent to each other. Thus, as shown in FIG. 4A, when the press bodies 30 which are disposed for the respective opening portions 70 are axially-rotated, the press bodies 30 adjacent to each other will never interfere with each other. In addition, as shown in FIG. 2A, owing to the fact that the grasping portion 32 has a small diameter compared with that of the press body 30, it is possible to prevent the chucking devices which grasp the grasping portions 32 adjacent to each other from interfering with each other.

With regard to the press body 30 shown in FIG. 4A, the diameter (long diameter) thereof is larger than the diagonal length of the opening portion 70 and the axially-rotating press body 30 covers the opening portion 70 completely in the planar view of the mold body 60. However, so long as it is possible for the press body 30 to cover the whole of the opening portion 70 by one rotation or more rotations, it is not necessary in the planar view to always cover the whole of the opening portion 70.

The press body 30 shown in FIG. 4B as a modified example is constituted such that by setting the long diameter thereof to be shorter than the diagonal length of the opening portion 70 and by axially-rotating the grasping portion 32, the passing area of the press body 30 will cover the whole opening portion 70. The press body 30 of this modified example forms a cross-section having an elliptical shape and the long diameter thereof is longer than the half of the diagonal length of the opening portion 70 and also is shorter than the diagonal length of the opening portion 70. The center of the grasping portion 32 is approximately in conformity with the center of the opening portion 70. By axially-rotating the grasping portion 32, the press body 30 covers the whole opening portion 70 during one rotation and it is possible to rub and cut the swelling portion 52 of the viscous admixture 50. So long as the press bodies 30 which are provided respectively at the adjacent plurality of opening portions 70 do not interfere one another, it is allowed to axially-rotate the adjacent press bodies 30 toward the same directions or toward the opposite directions. In FIG. 4B, there is illustrated an aspect as an example in which the adjacent press bodies 30 protrude respectively toward the same directions from the grasping portions 32 and also axially-rotate toward the same directions.

It should be noted for still another modified example of the press body 30 that it is allowed, by using a planetary gear mechanism or the like and by axially-rotating the grasping portion 32 while being made to be eccentric, to enlarge the passing area of the press body 30. In this case, it is possible to shorten the long diameter of the press body 30 than the diagonal length of the opening portion 70. In other words, it is enough if the total length of the eccentric length (radius) of the grasping portion 32 and the long diameter of the press body 30 exceeds the half of the diagonal length of the opening portion 70. Thus, it is possible to cover the whole opening portion 70 owing to the fact that the press body 30 rotates a plurality of times.

Figure 9A:
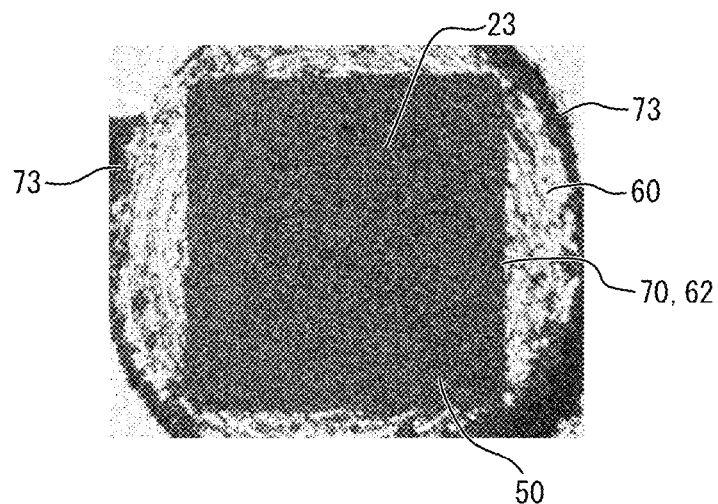
FIG. 9A is a photograph showing a planar view state after the pushing-in process in the first manufacturing method.

FIG. 9A is a photograph showing a planar view state after the pushing-in process (S30) in the first manufacturing method. As shown in the same drawing, it is possible to confirm that the viscous admixture 50 is rubbed and cut by the same surface as the upper surface of the mold body 60 and the viscous admixture 50 is filled in the whole opening portion 70 without a gap.

Figure 9B:
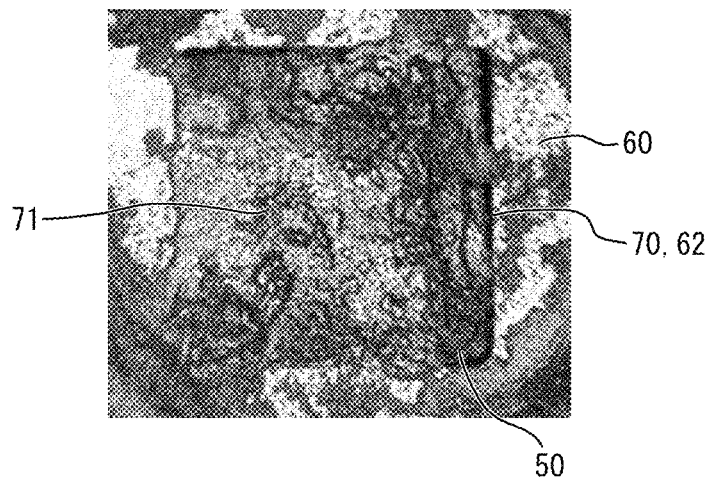
FIG. 9B is a photograph showing a planar view state after the pushing-in process in the manufacturing method relating to a reference-example 1.

FIG. 9B is a photograph showing a planar view state after the pushing-in process in the manufacturing method relating to a reference-example 1. The manufacturing method of the reference-example 1 is a method in which instead of the process S32a of the first manufacturing method, the press body 30 is separated vertically from the mold body 60 without rotation (see FIG. 2B). According to such a manufacturing method, it is possible to fill the viscous admixture 50 tightly in the periphery of the coil assembly body 10 by pushing the viscous admixture 50 in the mold body 60 by using the press body 30. However, the press body 30 is removed in a state that a portion of the viscous admixture 50 facing the opening portion 70 adheres to the lower surface thereof and therefore, concave or convex portions 71 are caused on the surface of the magnetic exterior body 20 and the surface is in a rough condition.

Figure 9C:
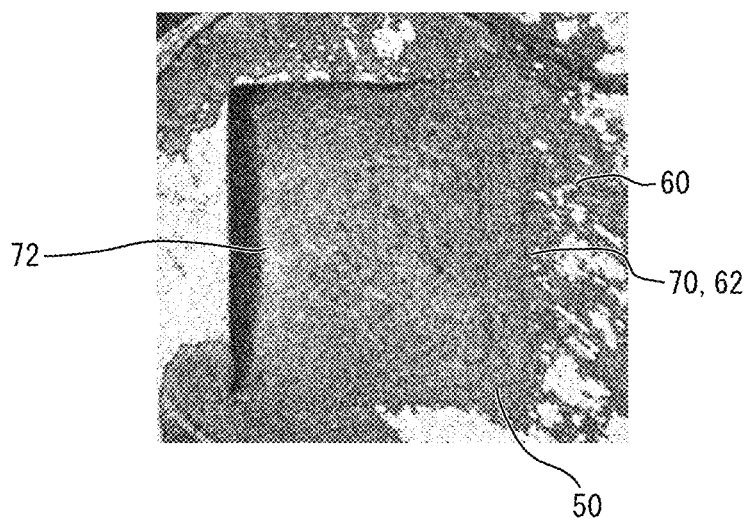
FIG. 9C is a photograph showing a planar view state after the pushing-in process in the manufacturing method relating to a reference-example 2.

FIG. 9C is a photograph showing a planar view state after the pushing-in process in the manufacturing method relating to a reference-example 2. The manufacturing method of the reference-example 2 is a method in which instead of the process S32a of the first manufacturing method, the press body 30 is slid toward the horizontal direction along the opening portion 70 without rotation (see FIG. 2B). Specifically, the press body 30 is slid toward the left direction in FIG. 9C. According to such a manufacturing method, it is possible to fill the viscous admixture 50 tightly in the periphery of the coil assembly body 10 by pushing the viscous admixture 50 in the mold body 60 by using the press body 30. However, the putty-like viscous admixture 50 having high viscosity adheres to the lower surface of the press body 30 and is dragged toward the horizontal direction and therefore, defective portions 72 of the viscous admixture 50 are caused at a portion of the area on the left side of the opening portion 70.

More specifically, according to the first manufacturing method shown in FIG. 9A, it is possible, by carrying out the process S32a in which for rubbing and cutting the viscous admixture 50 by rotating the press body 30 and even if using the putty-like viscous admixture 50 having high viscosity, to fill this admixture in the whole cavity portion 62 and also to complete the surface of the viscous admixture 50 facing the opening portion 70 in a flat condition.

The coil component 100 which is manufactured by the first manufacturing method has a feature in which a plurality of concentric scratch marks 23 are formed on a counter surface 22 with respect to the terminal portions 16 within the magnetic exterior body 20 (see FIG. 2C and FIG. 9A). The scratch marks 23 are caused by a phenomenon in which the magnetic powders included in the viscous admixture 50 are dragged in concentric shapes by the friction with respect to the lower surface of the press body 30. More specifically, the fact that a plurality of concentric scratch marks 23 are formed on the counter surface 22 of the terminal portions 16 within the magnetic exterior body 20 expresses a matter that the viscous admixture 50 is rubbed and cut by the rotating press body 30 in a state of being pushed in the mold body 60. For such a coil component 100, the magnetic exterior body 20 is filled in the periphery of the coil assembly body 10 without a gap, so that the component is excellent in the thermal and mechanical characteristics and is excellent in the yield property. In other words, the coil component 100 having such a scratch mark 23 on the counter surface 22 with respect to the terminal portions 16 is excellent in productivity.

Next, by thermally-curing the viscous admixture 50 which was pushed-in, the magnetic exterior body 20 which covers the coil assembly body 10 is formed (Forming Process S40).

As shown in FIG. 14, in the forming process S40 of the first manufacturing method, the magnetic exterior body 20 is formed by thermally-curing the viscous admixture 50 in the inside of the mold body 60 (Process S41a). In the process S41a, the heating is executed until the thermal curing temperature or more with regard to the thermosetting resin (second component). In a case in which the solvent (third component) is added to the viscous admixture 50, the solvent is removed by being vaporized in the process S41a. Then, after the magnetic exterior body 20 is thermally-cured sufficiently, the coil component 100 is taken out from the mold body 60 (Process S42a). The molded coil component 100 is shown in FIG. 2C. Heat-resistant tray 74 will be mentioned below.

When taking out the coil component 100 from the mold body 60, it is preferable to use a take-out jig such as a protruding rod 34 (see FIG. 6B) or the like. It is preferable to take out the coil component 100 in a state in which the integrated jig 61 and the bottom unit 64 are separated and the cavity portion 62 is made to pass-through in the up and down direction. It is allowed to take out the coil component 100 toward either of the upward and downward directions of the cavity portion 62.

It is allowed to carry out a post-treatment process after the forming process S40. For the post-treatment process, it is possible to cite a polishing process and/or a sealing process of the surface of the magnetic exterior body 20. It is allowed to form a coated-layer 80 of thermosetting resin on the surface of the magnetic exterior body 20 which is formed in the forming process S40. Thus, in the sealing process, it is possible to affix a seal on the coated-layer 80 by heating toward specified characters or graphic patterns. The thermosetting resin of the coated-layer 80 is made to be the second component of the viscous admixture 50 and it is allowed to use the same kind of resin material as mentioned above or to use a different kind thereof.

In this manner above, the coil component 100 is produced by the first manufacturing method.

Next, there will be explained second to tenth manufacturing methods. Repetitive explanations with those in the already described manufacturing methods such as the first manufacturing method or the like will be omitted arbitrarily. For example, the process S11b in the preparing process S10, the process S21b and the process S22b in the putting-in process S20 or the like of the second manufacturing method are common to the process S11a, the process S21a and the process S22a in the first manufacturing method respectively and therefore, only the reference numerals are indicated in the flowcharts of FIGS. 11 to 14 and the explanations thereof will be omitted. It is assumed that the situation is all the same also with regard to other manufacturing methods.

<Second Manufacturing Method>

The second manufacturing method is carried out according to respective processes which are shown by being added with suffixes "b" in the flowcharts of FIGS. 11 to 14.

The second manufacturing method is common to the first manufacturing method except an aspect that in the pushing-in process S30 shown in FIG. 13, the press body 30 is pressed against the swelling portion 52 while being rotated in an in-plane direction of the opening portion 70. More specifically, while the press body 30 is descended substantially without rotation with respect to the swelling portion 52 (Process S31a) in the first manufacturing method, in the second manufacturing method, the press body 30 is pressed against the swelling portion 52 by being descended while being rotated axially (Process S31b). In the second manufacturing method, as shown by broken lined arrows in FIG. 2A, the press body 30 is descended as far as the upper surface of the mold body 60 by an elevation mechanism (not shown) while being axially-rotated coaxially with the grasping portion 32.

Thus, according to the second manufacturing method, the swelling portion 52 is pressed in a state in which the viscous admixture 50 is loaded with shearing stress by the rotating press body 30 and the viscosity thereof is lowered. For this reason, it is possible to heighten the fluidity of the viscous admixture 50 in the inside of the cavity portion 62 compared with that in the first manufacturing method and it is possible to further suppress a phenomenon in which an air gap is caused in the periphery of the coil assembly body 10.

<Third Manufacturing Method>

The third manufacturing method is carried out according to respective processes which are shown by being added with suffixes "c" in the flowcharts of FIGS. 11 to 14.

The third manufacturing method is different from the first manufacturing method in an aspect in which in the forming process S40 shown in FIG. 14, complete-curing is carried out after taking out the coil component 100 from the mold body 60. More specifically, in the first manufacturing method, the magnetic exterior body 20 is thermally-cured by heating the mold body 60 up to the temperature by which the viscous admixture 50 is completely-cured (Process S41a) and the coil component 100 after being cured are taken out from the mold body 60 (Process S42a). On the other hand, in the third manufacturing method, the viscous admixture 50 is thermally-cured by a first temperature in the inside of the mold body 60 (Process S41c) and the semi-cured viscous admixture 50 is taken out together with the coil assembly body 10 from the mold body 60 (Process S42c). Then, the taken-out viscous admixture 50 is thermally-cured (completely-cured) by a second temperature which is higher than the first temperature (Process S43c). More specifically, in the third manufacturing method, the coil component 100 is taken out from the mold body 60 after semi-curing the viscous admixtures 50 by a comparatively low temperature in the inside of the mold body 60 and the magnetic exterior body 20 is completely-cured by a comparatively high temperature on the outside of the mold body 60.

The first temperature is less than the thermal curing temperature of the thermosetting resin (second component). In case of including a solvent (third component) in the viscous admixture 50, the first temperature is set to be the volatilization temperature or more with regard to the solvent. The second temperature is the thermal curing temperature or more with regard to the thermosetting resin which is included in the viscous admixture 50. The solvent is vaporized and the viscous admixture 50 becomes a semi-cured state by heating the mold body 60 and the viscous admixture 50 by the first temperature. It is allowed to set the first temperature as the curing-start temperature or more with regard to the thermosetting resin and also allowed to set it as a temperature less than the complete-curing temperature.

In the third manufacturing method, by taking out the coil component 100 from the mold body 60 in a state in which the viscous admixture 50 is semi-cured by a first temperature of comparatively low temperature, there can be obtained such a merit that the washing process of the mold body 60 is easy. More specifically, as shown in FIG. 9A, a residue 73 of the viscous admixture 50 which was rubbed and cut in the pushing-in process S30 adheres to the periphery of the mold body 60. In order to manufacture the coil components 100 continuously by using the mold body 60 repeatedly, there is a case in which there is carried out a washing process for removing such a residue 73. At that time, if the residue 73 is completely-cured, a lot of time is required for the washing process. On the other hand, by taking out the coil component 100 from the mold body 60 in a state in which the viscous admixture 50 and the residue 73 are semi-cured by heating the mold body 60 by the first temperature of comparatively low temperature such as in a case of the third manufacturing method, it is possible to remove the residue 73 easily from the mold body 60 after the take-out thereof.

With regard to the coil component 100 which is taken out from the mold body 60 in the process S42c, it is preferable to completely-cure the magnetic exterior body 20 thereof by being heated by the second temperature in a state of being placed on a heat-resistant tray 74 as shown in FIG. 2C.

<Fourth Manufacturing Method>

The fourth manufacturing method is carried out according to respective processes which are shown by being added with suffixes "d" in the flowcharts of FIGS. 11 to 14.

The fourth manufacturing method is a method obtained by combining the second and third manufacturing methods. Specifically, in the pushing-in process S30 shown in FIG. 13, similarly as the second manufacturing method, the press body 30 is pressed against the swelling portion 52 while being rotated in an in-plane direction of the opening portion 70 (Process S31d). In addition, in the forming process S40 shown in FIG. 14, the viscous admixture 50 is thermally-cured (semi-cured) by a first temperature in the inside of the mold body 60 (Process S41d) and the semi-cured viscous admixture 50 is taken out together with the coil assembly body 10 from the mold body 60 (Process S42d). Then, the taken-out viscous admixture 50 is thermally-cured (completely-cured) by a second temperature which is higher than the first temperature (Process S43d).

According to the fourth manufacturing method, the swelling portion 52 is pressed in a state in which the viscous admixture 50 is loaded with shearing stress by the rotating press body 30 and the viscosity thereof is lowered (Process S31d) and therefore, it is possible to excellently spread the viscous admixture 50 in the whole cavity portion 62 including the periphery of the coil assembly body 10. Therefore, when taking out the coil component 100 in a semi-cured state from the mold body 60 (Process S41d), it is possible to suppress the shape deterioration of the magnetic exterior body 20 excellently.

<Fifth Manufacturing Method>

Figure 5A:
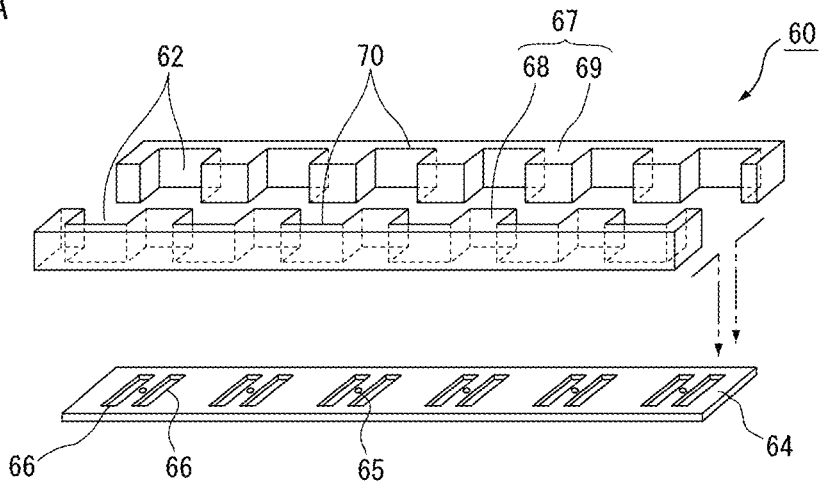
FIG. 5A is an exploded perspective view showing a mold body which is used in fifth and sixth manufacturing methods of the coil component.
Figure 5B:
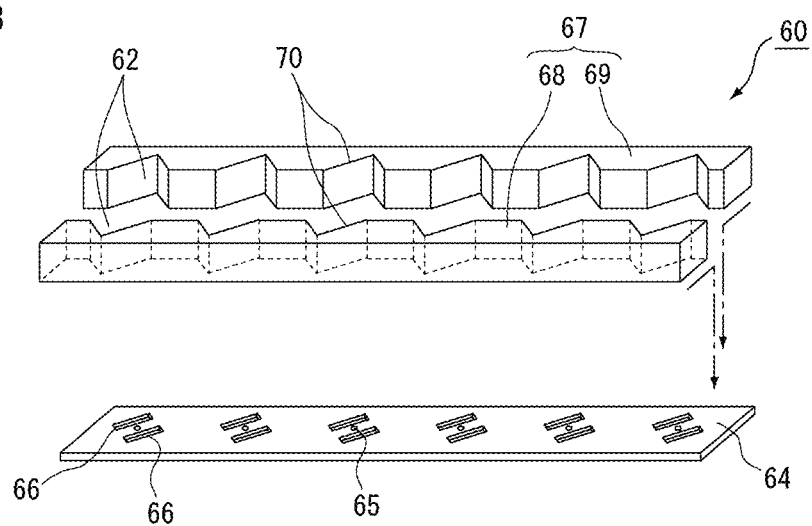
FIG. 5B is an exploded perspective view showing a modified example of the mold body which is used in the fifth and sixth manufacturing methods.

The fifth manufacturing method is carried out according to respective processes which are shown by being added with suffixes "e" in the flowcharts of FIGS. 11 to 14. FIG. 5A is an exploded perspective view showing a mold body 60 which is used in fifth and sixth manufacturing methods. FIG. 5B is an exploded perspective view showing a modified example of the mold body 60 which is used in the fifth and sixth manufacturing methods.

The mold body 60 which is used in the fifth manufacturing method is different from that of the first manufacturing method in an aspect that there are included a plurality of split-molds 68, 69 which will produce cavity portions 62 when combined with each other.

As shown in FIG. 11 and FIG. 5A, in the preparing process S10 of the fifth manufacturing method, a split-jig 67 and the bottom unit 64 are prepared for the mold body 60. The split-jig 67 is a mold in which a plurality of cavity portions 62 having rectangular shapes are formed by penetration-shapes by combining a pair of split-molds 68, 69 with each other. In FIG. 5A, there is exemplified a split-jig 67 by which six pieces of cavity portions 62 are formed, but there is particularly no limitation caused by the number of the cavity portions 62 and arrangement thereof. The split-molds 68, 69 and the bottom unit 64 are assembled integrally by a holder (not shown).

Each of the split-molds 68, 69 shown in FIG. 5A includes elongated and rectangular-shaped cavity portions 62 obtained by cutting the rectangular-shaped opening portions 70 by a straight line which passes the centers of the counter sides thereof. Each of the split-molds 68, 69 which are shown in FIG. 5B and which relate to a modified example of the mold body 60 includes triangular-shaped cavity portions 62 obtained by cutting the rectangular-shaped opening portions 70 by a straight line which passes the counter vertexes thereof. The pair of concave portions 66 which are formed on the bottom unit 64 is disposed corresponding to the installation direction of the coil assembly body 10 which is put in the cavity portion 62. In FIGS. 5A and 5B, there is shown an example in which the concave portions 66 are formed in parallel with the sides of the rectangular-shaped opening portions 70.

More specifically, it is possible for the split-jig 67 shown in FIGS. 5A and 5B to separate the split-molds 68, 69 each other in the orthogonal direction with respect to the penetration direction (up and down direction) of the cavity portion 62.

In the forming process S40 of the fifth manufacturing method, by separating the plurality of split-molds 68, 69 each other, the split-molds 68, 69 are removed from the viscous admixture 50 which is pushed in the pushing-in process S30 (Process S41e). Then, the magnetic exterior body 20 is formed by thermally-curing the viscous admixture 50 from which the split-molds 68, 69 are removed (Process S42e).

More specifically, in the fifth manufacturing method, it is possible to separate the split-molds 68, 69 from the viscous admixture 50 toward the side directions without pushing off the viscous admixture 50, which was pushed in the pushing-in process S30, from the cavity portion 62 by using a take-out jig such as the protruding rod 34 (see FIG. 6B) or the like. For this reason, in the process S41e, it is possible to take out the viscous admixture 50 in a state of the uncured state easily from the mold body 60.

From such a viewpoint that it is possible to take out the viscous admixture 50 easily from the split-jig 67, it is preferable to produce the split-molds 68, 69 by a resin material such as polytetrafluoroethylene (PTFE) or the like which has an excellent mold-releasable property.

It should be noted that instead of the fifth manufacturing method, it is allowed to take out the viscous admixture 50 from the split-jig 67 after being semi-cured similarly as the processes from the process S41c to the process S43c in the forming process S40 of the third manufacturing method. More specifically, it is also allowed to employ a procedure in which after the viscous admixture 50 (magnetic exterior body 20) is semi-cured in the inside of the mold body 60 by a first temperature, the split-molds 68, 69 are separated from the viscous admixture 50, the coil component 100 is taken out from the mold body 60, and thereafter, the magnetic exterior body 20 is completely-cured by heating the coil component 100 by a second temperature.

<Sixth Manufacturing Method>

The sixth manufacturing method is carried out according to respective processes which are shown by being added with suffixes "f" in the flowcharts of FIGS. 11 to 14.

In the forming process S40 of the sixth manufacturing method, the viscous admixture 50 is thermally-cured by being heated together with the split-jig 67 (Process S41f). At that time, by separating the plurality of split-molds 68, 69 mutually, it is possible to reduce phenomena in which the thermally-cured magnetic exterior bodies 20 are attached to the split-jig 67 and it is possible to take out the coil components 100 easily from the split-jig 67 (Process S42f).

Also in a case in which, such as the sixth manufacturing method, the magnetic exterior body 20 is completely-cured by heating the viscous admixture 50 up to the second temperature in the inside of the mold body 60 (split-jig 67), it is possible to take out the coil component 100 easily by separating the split-molds 68, 69 each other (Process S42f).

It should be noted that for the pushing-in process S30 of the fifth and sixth manufacturing methods, it is explained, in FIG. 13 similarly as in a case of the first manufacturing method, that the press body 30 is descended substantially without rotation with respect to the mold body 60 (Process S31e and Process S31f), but the present invention is not limited by this configuration. It is also allowed to descend the press body 30 while being rotated with respect to the mold body 60 such as the process S31b and the process S32b of the second manufacturing method.

<Seventh Manufacturing Method>

Figure 6A:
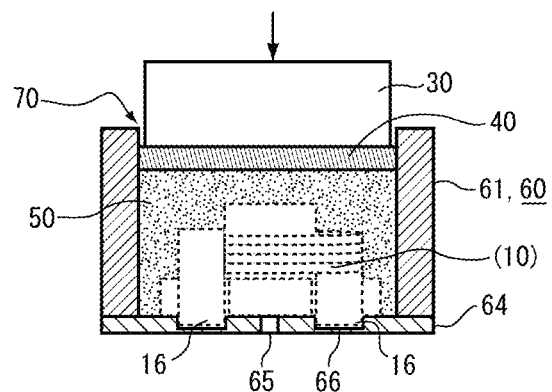
FIG. 6A, FIG. 6B and FIG. 6C are front elevational views schematically showing seventh and eighth manufacturing methods of the coil component.
Figure 6B:
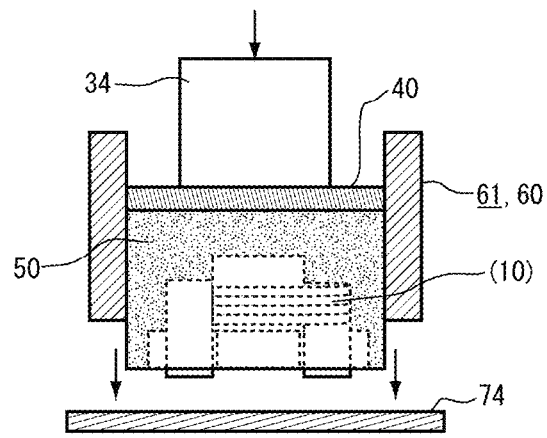
Figure 6C:
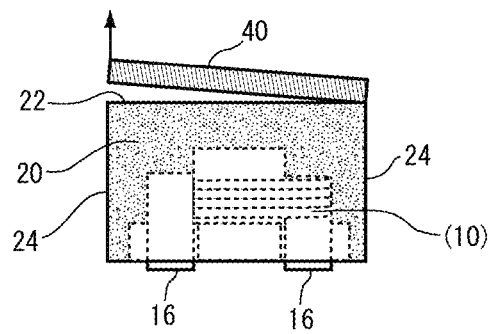

The seventh manufacturing method is carried out according to respective processes which are shown by being added with suffixes "g" in the flowcharts of FIGS. 11 to 14. FIGS. 6A to 6C are front elevational views schematically showing seventh and eighth manufacturing methods of the coil component. In the same drawings, with regard to the hatching showing the cross-section of the coil assembly body 10, the illustration thereof is omitted.

The seventh manufacturing method is different from the first manufacturing method in an aspect in which the viscous admixture 50 which is put in the cavity portions 62 is covered by a lid member 40 having an excellent mold-releasable property, and in the pushing-in process S30, the viscous admixture 50 is pushed-in by pressing the press body 30 against the lid member 40.

More specifically, in the pushing-in process S30 of the first to sixth manufacturing methods, the swelling portion 52 of the viscous admixture 50 is rubbed, cut and planarized by ascending the press body 30 while being rotated axially in contact with the upper surface of the mold body 60. On the other hand, in the seventh and eighth manufacturing methods, owing to the pressing force by the press body 30, the upper surface of the viscous admixture 50 is pushed-in flatly through the lid member 40.

In the preparing process S10 of the seventh manufacturing method, as shown in FIG. 11 and FIG. 6A, the mold body 60 and the lid member 40 are prepared. The lid member 40 of this exemplified embodiment is a mold releasing sheet which prevents the press body 30 from being attached directly to the viscous admixture 50, and also, which can be peeled easily from the magnetic exterior body 20 after the thermal molding.

The lid member 40 is composed of a resin material having an excellent mold-releasable property and it is possible as one example to use a fluororesin material such as polytetrafluoroethylene (PTFE) or the like. There is no limitation for the thickness of the lid member 40 in particular and it is also allowed to employ a plate shape, a block shape or the like other than a so-called sheet shape. The lid member 40 has approximately the same shape as that of the opening portion 70 and has substantially the same shape and size. Thus, it is possible to arrange the lid member 40 in the inside of the opening portion 70 without a gap.

In the putting-in process S20 of the seventh manufacturing method, the coil assembly body 10 is put in the cavity portion 62 and the terminal portions 16 are fitted with the concave portions 66 of the bottom unit 64 (Process S21g). Next, the viscous admixture 50, which is measured in a predetermined amount, is put-in as far as a position lower than the opening portion 70 (Process S22g). Further, the lid member 40 having approximately the same shape as that of the opening portions 70 is provided in the inside of the opening portion 70. Then, in the pushing-in process S30 as shown in FIG. 13 and FIG. 6A, the press body 30 having a thinner diameter than that of the opening portion 70 is pressed against the lid members 40.

Thus, by forming the lid member 40 in approximately the same shape as that of the opening portion 70, it never happens that the viscous admixture 50 leaks out from the gap between the opening portion 70 and the lid member 40. In addition, by using the press body 30 having a thinner diameter than that of the opening portion 70, it is possible to prevent the magnetic powders of the viscous admixture 50 from biting in between the press body 30 and the mold body 60.

In more detail, the viscous admixture 50 which was put in the putting-in process S20 is planarized by a squeegee (not shown) or the like if desired and thereafter, in the pushing-in process S30, the lid member 40 is placed on the surface of the viscous admixture 50 (Process S31g). Next, by descending the press body 30 substantially without rotation, the lid member 40 is pressed downward (Process S32g). Thus, the lid member 40 is prevented from being deformed caused by the friction force with respect to the press body 30. For a similar reason, after pushing the viscous admixture 50 in the mold body 60 sufficiently, the press body 30 is ascended without rotation (Process S33g).

In the forming process S40 of the seventh manufacturing method, as shown in FIG. 14 and FIG. 6B, first, the viscous admixture 50 which is covered by the lid member 40 and pushed in the mold body 60 is taken out from the mold body 60 together with the coil assembly body 10 (Process S41g). Specifically, the viscous admixture 50 and the coil assembly body 10 are pushed down by a protruding rod 34 or the like from the upward side of the mold body 60. Next, the magnetic exterior body 20 is formed by thermally-curing the taken-out viscous admixture 50 (Process S42g). When thermally-curing the viscous admixture 50, it is preferable to carry out the thermal-curing in a state in which the viscous admixture 50 and the coil assembly body 10 are placed on a heat-resistant tray 74. Then, after the magnetic exterior body 20 is thermally-cured, heat removal is carried out if desired and thereafter, the lid member 40 is peeled off from the magnetic exterior body 20 (Process S43g). It is allowed to form a peeling start portion (not shown) on the one side of the rectangular shaped lid member 40 such that it is possible to peel off the lid member 40 from the magnetic exterior body 20 easily as shown by an arrow in FIG. 6C. It is possible to form the peeling start portion by notching one side of the lid member 40 a little bit or by folding the one side thereof.

The coil component 100, which is manufactured by the seventh manufacturing method, has a specific feature in which for the counter surface 22 with respect to the terminal portions 16 within the magnetic exterior body 20, the magnetic powders thereof are arranged smoothly compared with those of the circumferential surfaces 24 adjacent to this counter surface 22 (see FIG. 6C). Thus, the counter surface 22 is excellent in glossiness compared with the circumferential surfaces 24, and a fine view is presented and concurrently, the mechanical characteristic thereof is excellent. Such a counter surface 22 tells a story that the pushing-in process S30 and the forming process S40 were carried out in a state in which the upper surface of the viscous admixture 50 was covered by the lid member 40. More specifically, with regard to such a coil component 100, the magnetic exterior body 20 is filled in the periphery of the coil assembly body 10 without a gap, and the component has a fine view, is excellent in the mechanical characteristic and is excellent in the yield property. In other words, the coil component 100, in which the magnetic powders of the counter surface 22 with respect to the terminal portions 16 are arranged smoothly compared with those of the circumferential surfaces 24, is excellent in productivity.

<Eighth Manufacturing Method>

The eighth manufacturing method is carried out according to respective processes which are shown by being added with suffixes "h" in the flowcharts of FIGS. 11 to 14.

The eighth manufacturing method is different in an aspect in which the viscous admixture 50 is taken out after being semi-cured in the inside of the mold body 60 similarly as the third manufacturing method instead of taking out the coil component 100 from the mold body 60 in an uncured state of the viscous admixture 50 in the forming process S40 of the seventh manufacturing method (Process S41g).

More specifically, in the forming process S40 of the eighth manufacturing method, the viscous admixture 50 is thermally-cured by a first temperature in the inside of the mold body 60 (Process S41h) and the semi-cured viscous admixture 50 is taken out from the mold body 60 together with the coil assembly body 10 (Process S42h). Then, the taken-out viscous admixture 50 is thermally-cured by a second temperature which is higher than the first temperature (Process S43h).

Then, in the eighth manufacturing method, differently from the third manufacturing method, the lid member 40 having an excellent mold-releasable property is peeled off from the completely-cured magnetic exterior body 20 (Process S44h). Thus, similarly as the seventh manufacturing method, the counter surface 22 with respect to the terminal portions 16 within the magnetic exterior body 20 is formed smoothly and minutely, and there can be formed the coil component 100 which has a fine view and is excellent in the mechanical characteristic.

<Ninth Manufacturing Method>

The ninth manufacturing method is carried out according to respective processes which are shown by being added with suffixes "i" in the flowcharts of FIGS. 11 to 14. FIGS. 7A to 7C are front elevational views schematically showing the ninth manufacturing method of the coil component. In the same drawings, with regard to the hatching showing the cross-section of the coil assembly body 10, the illustration thereof is omitted.

The mold body 60 which is used for the ninth manufacturing method is formed by a resin material having an excellent mold-releasable property. For such a resin material, it is possible to cite a silicone rubber material as an example. In the preparing process S10 of the ninth manufacturing method shown in FIG. 11, there is prepared such a mold body 60 (Process S11i).

With regard to the mold body 60 which is used for the ninth manufacturing method, as shown in FIG. 7A, the integrated jig 61 and the bottom unit 64 are formed integrally. At the bottom unit 64, there are formed the concave portions 66 for fitting the terminal portions 16 thereto.

The mold body 60 which is used for the ninth manufacturing method has flexibility and also, includes an aligned plurality of cavity portions 62. In the putting-in process S20 shown in FIG. 7A and FIG. 12, the viscous admixture 50 and the coil assembly body 10 are put in each of the plurality of cavity portions 62. Specifically, the coil assembly body 10 is put in the cavity portion 62 and the terminal portions 16 are fitted with the concave portions 66 (Process S21i) and next, the viscous admixture 50 is put in the cavity portions 62 and the swelling portion 52 which overflows from the opening portions 70 is formed (Process S22i).

In the pushing-in process S30, as shown in FIG. 7B, the swelling portion 52 is pressed by descending the press body 30 while being rotated (Process S31i) and further, the press body 30 is ascended, while rubbing and cutting the swelling portion 52 by the press body 30 (Process S32i). Thus, the upper surface of the viscous admixture 50 is formed flatly with a height which is flush with the opening portion 70 of mold body 60. It should be noted that it is also allowed in the ninth manufacturing method to descend the press body 30 substantially without rotation similarly as the first manufacturing method.

In the forming process S40, by thermally-curing the respective viscous admixtures 50 in the inside of the mold body 60, a plurality of magnetic exterior bodies 20 are formed (Process S41i). The ninth manufacturing method is different from the first to fourth manufacturing methods in an aspect in which as shown in FIG. 7C, the formed plurality of the magnetic exterior bodies 20 are taken out from the cavity portions 62 by bending the mold body 60 so as to bend backward in the alignment direction of the cavity portions 62.

More specifically, the mold body 60 which is used for the ninth manufacturing method is formed by a resin material having flexibility and also having excellent mold-releasable property, so that by bending the opening portions 70 of the mold body 60 as a whole so as to push and expand them, the downward side of the integrated jig 61 is made to be narrower and the magnetic exterior bodies 20 are pushed out from the cavity portions 62. The mold body 60 is composed of a sufficiently soft material compared with those of the magnetic exterior bodies 20 and therefore, it never happens that the mold body 60 damages the magnetic exterior bodies 20 when taking-out the magnetic exterior bodies 20. According to the ninth manufacturing method, it is possible to take out a lot of coil components 100 after the forming speedily from the mold body 60.

<Tenth Manufacturing Method>

The tenth manufacturing method is carried out according to respective processes which are shown by being added with suffixes "j" in the flowcharts of FIGS. 11 to 14. FIGS. 8A to 8C are front elevational views schematically showing the tenth manufacturing method. In the same drawings, with regard to the hatching showing the cross-section of the coil assembly body 10, the illustration thereof is omitted.

The tenth manufacturing method is different from the ninth manufacturing method in an aspect of the timing and the putting-in direction for putting the coil assembly bodies 10 with respect to the cavity portions 62. In the tenth manufacturing method, it is possible to use the mold body 60 which is used in the ninth manufacturing method.

As described above, the coil assembly body 10 is connected to the coil 15 and is provided with the terminal portions 16 which are exposed from the magnetic core 12. After the viscous admixture 50 is put in the cavity portion 62 (Process S21j) in the putting-in process S20 shown in FIG. 12, the coil assembly body 10 is put in the viscous admixture 50 (Process S22j). Specifically, the coil assembly body 10 is placed on the viscous admixture 50 such that the terminal portions 16 are to be disposed from the viscous admixture 50. Then, in the pushing-in process S30 shown in FIG. 13, the coil assembly body 10 which is placed on the viscous admixture 50 is pressed toward the viscous admixture 50 in the pushed-in direction.

In more specifically, in the process S21j, a measured predetermined amount of the viscous admixture 50 is put in the cavity portion 62 as shown in FIG. 8A. Next, in the process S22j, the coil assembly body 10 is placed on the viscous admixture 50 by directing the plate-shaped portion 13 thereof toward the upward direction. Thus, the core portion 14 and the coil 15 which are portions of the coil assembly body 10 are buried-in with respect to the viscous admixture 50.

In the pushing-in process S30 shown in FIG. 8B, the coil assembly body 10 is pushed-in more deeply with respect to the viscous admixture 50 by descending the press body 30 without rotation (Process S31j). At that time, it is allowed to cover the upper surface of the plate-shaped portion 13 and the terminal portion 16 by a protection sheet 42 such that the press body 30 will not damage the plate-shaped portion 13 and the terminal portion 16. By pushing down the press body 30 as far as a predetermined depth, the coil assembly body 10 is buried in the viscous admixture 50 more deeply and the whole coil assembly body 10 except the terminal portions 16 is buried in the viscous admixture 50. From such a state, the press body 30 is ascended and the pushing-in process S30 is finished (Process S32j).

In the forming process S40 of the tenth manufacturing method, the viscous admixture 50 is thermally-cured by heating the mold body 60 and the viscous admixture 50 (Process S41j) and thereafter, the thermally-cured magnetic exterior body 20 (coil component 100) is taken out from the mold body 60 (Process S42j).

As described above, the mold body 60 used in the tenth manufacturing method is formed by a resin material having flexibility and also excellent mold-releasability. Thus, in the tenth manufacturing method, it is possible, as shown in FIG. 8C, to take out the formed plurality of the magnetic exterior bodies 20 from the cavity portions 62 by bending the mold body 60 so as to bend backward in the alignment direction of the cavity portions 62. Thus, it is possible to take out the plurality of the coil components 100 from the mold body 60 easily and also speedily.

As described above, according to the first to tenth manufacturing methods, the viscous admixture 50, which is put in the cavity portion 62 in the putting-in process S20, is pushed in the pushing-in process S30, so that the viscous admixture 50 is filled in the inside of the cavity portion 62 preferably without causing an air gap in the periphery or the like of the coil assembly body 10. Then, there are the above-mentioned unique features in the first to tenth manufacturing methods and thus, it is possible to produce the coil components 100 by high quality and by high productivity.

It should be noted that the present invention is not to be limited by the exemplified embodiments mentioned above and includes embodiments such as various kinds of modifications, improvements or the like so long as the objects of the present invention can be achieved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A manufacturing method of a coil component comprising:
   preparing a coil assembly body in which a coil is attached on a magnetic core and a mold body which is formed with a cavity portion in the inside thereof and which includes at least one opening portion,
   putting a viscous admixture including magnetic powders and thermosetting resin and the coil assembly body in the cavity portion,
   pushing the put-in viscous admixture in the mold body, and
   thermally-curing the pushed-in viscous admixture and forming a magnetic exterior body which covers the coil assembly body, wherein
   the viscous admixture put in the cavity portion is covered by a lid member,
   in the pushing, the viscous admixture is pushed in by pressing a press body against the lid member,
   after the pushing, the coil assembly body with the viscous admixture covered by the lid member is taken out from the mold body,
   in the thermally-curing the pushed-in viscous admixture, the magnetic exterior body covered by the lid member is formed by thermally-curing the taken-out viscous admixture, and
   after the thermally-curing the pushed-in viscous admixture, the lid member is peeled away from the magnetic exterior body.

2. The manufacturing method of a coil component according to claim 1, wherein
   in the putting, the viscous admixture is put as far as a lower position compared with the opening portion,
   there is provided the lid member having approximately the same shape as the opening portion inside the opening portion, and
   in the pushing, the press body having a thin diameter compared with the opening portion is pressed against the lid member.

3. The manufacturing method of a coil component according to claim 1, wherein the mold body is formed by a resin material having an excellent mold-releasable property.

4. The manufacturing method of a coil component according to claim 1, wherein the mold body includes a plurality of split-molds which define the cavity portions by being mutually combined.

5. The manufacturing method of a coil component according to claim 4, wherein the split-molds are removed from the viscous admixture which was pushed-in the pushing by mutually separating the plurality of split-molds and the magnetic exterior body is formed by thermally-curing the viscous admixture from which the split-molds were removed.

6. The manufacturing method of a coil component according to claim 1, wherein
in the putting, the coil assembly body is attached to the bottom portion of the cavity portion and thereafter, the coil assembly body is buried by putting the viscous admixture, and
in the pushing, the viscous admixture facing the opening portion is pressed toward the coil assembly body.

7. The manufacturing method of a coil component according to claim 6, wherein
the coil assembly body includes a terminal portion which is connected to the coil and which is exposed from the magnetic core, and
at the bottom portion of the cavity portion, there is provided a concave portion which houses the terminal portion and which separates the terminal portion and the viscous admixture.

8. The manufacturing method of a coil component according to claim 1, wherein
the coil assembly body includes a terminal portion which is connected to the coil and which is exposed from the magnetic core,
in the putting, the viscous admixture is put in the cavity portion and thereafter, the coil assembly body is placed on the viscous admixture such that the terminal portion is exposed from the viscous admixture, and
in the pushing, the placed coil assembly body is pressed toward the viscous admixture in the pushing-in direction.

9. The manufacturing method of a coil component according to claim 1, wherein a thermosetting-resin coated-layer is formed on the surface of the formed magnetic exterior body.

* * * * *